US012661299B1

(12) United States Patent
Cummings

(10) Patent No.: US 12,661,299 B1
(45) Date of Patent: Jun. 23, 2026

(54) HYDROGEN-INFUSED ELECTROLYTIC AEROSOL WELLNESS SYSTEM

(71) Applicant: Ionic Cloud, LLC, Westlake Village, CA (US)

(72) Inventor: Craig Cummings, Park City, UT (US)

(73) Assignee: Ionic Cloud, LLC, Westlake Village, CA (US)

( * ) Notice: Subject to any disclaimer, the term of this patent is extended or adjusted under 35 U.S.C. 154(b) by 0 days.

(21) Appl. No.: 19/306,943

(22) Filed: Aug. 21, 2025

(51) Int. Cl.

| | |
|---|---|
| ***A61H 33/06*** | (2006.01) |
| ***A61H 33/00*** | (2006.01) |
| ***C25B 1/04*** | (2021.01) |
| ***C25B 9/19*** | (2021.01) |
| ***C25B 13/08*** | (2006.01) |
| ***C25B 15/02*** | (2021.01) |
| ***C25B 15/08*** | (2006.01) |

(52) U.S. Cl.
CPC ............. *A61H 33/06* (2013.01); *A61H 33/60* (2013.01); *C25B 1/04* (2013.01); *C25B 9/19* (2021.01); *C25B 13/08* (2013.01); *C25B 15/02* (2013.01); *C25B 15/08* (2013.01); *A61H 2033/068* (2013.01)

(58) Field of Classification Search
CPC .. A61H 33/06; A61H 33/60; A61H 2033/068; C25B 1/04; C25B 9/19; C25B 13/08; C25B 15/02; C25B 15/08
USPC .............................. 4/524, 535; 607/1, 81, 83
See application file for complete search history.

(56) References Cited

U.S. PATENT DOCUMENTS

| | | | | |
|---|---|---|---|---|
| 3,707,643 A * | 12/1972 | Yannopoulos | H01K 3/22 313/579 |
| 4,001,650 A * | 1/1977 | Romain | F24F 6/06 361/86 |
| 4,776,990 A * | 10/1988 | Verity | B05B 12/081 261/130 |
| 8,857,651 B2 * | 10/2014 | Stelzl | B60K 15/077 169/45 |
| 9,433,695 B2 * | 9/2016 | Aamodt | A61L 2/22 |
| 9,625,041 B1 * | 4/2017 | Lopez | F16K 31/535 |
| 9,657,401 B2 | 5/2017 | Lin | |
| 10,190,224 B2 | 1/2019 | Lin | |
| 11,052,216 B2 | 7/2021 | Lin | |
| 11,865,265 B2 | 1/2024 | Lin | |
| 12,422,047 B1 * | 9/2025 | Goettl | F16K 11/072 |

(Continued)

FOREIGN PATENT DOCUMENTS

| | | | | |
|---|---|---|---|---|
| AU | 2023201374 A1 * | 4/2024 | C25B 15/083 |
| AU | 2023245126 A1 * | 10/2024 | C25B 15/02 |

(Continued)

*Primary Examiner* — Lori L Baker

(74) *Attorney, Agent, or Firm* — Stephen B. Katsaros; Patent Engineering, LLC

(57) ABSTRACT

A system for generating a hydrogen-infused electrolytic aerosol for wellness applications that may include a housing with a water tank containing an aqueous electrolyte solution, at least one ultrasonic transducer positioned in the water tank to form a vapor cloud of the aqueous electrolyte solution, and a hydrogen generation unit that generates hydrogen gas that is combined with the vapor cloud in a mixing chamber that is presented to a conveyance path connected to the enclosure where a first light source emits light to illuminate the vapor cloud.

18 Claims, 11 Drawing Sheets

(56) References Cited

U.S. PATENT DOCUMENTS

| | | | | |
|---|---|---|---|---|
| 2009/0108085 | A1* | 4/2009 | Wang | F24F 5/0046 239/338 |
| 2009/0134098 | A1* | 5/2009 | Eng | C02F 1/005 210/205 |
| 2012/0279498 | A1* | 11/2012 | Nakamura | A61M 11/06 128/200.21 |
| 2014/0374243 | A1* | 12/2014 | Lin | C25B 9/00 204/278 |
| 2022/0118146 | A1* | 4/2022 | Kwon | F24F 6/02 |
| 2024/0401219 | A1* | 12/2024 | Wolfs | C25B 1/04 |

FOREIGN PATENT DOCUMENTS

| | | | | | |
|---|---|---|---|---|---|
| CA | 3096153 | A1 | * | 4/2021 | G05B 13/027 |
| CH | 699049 | B1 | * | 1/2010 | E04H 4/12 |
| CN | 203291354 | U | * | 11/2013 | C25B 15/08 |
| CN | 103800979 | A | * | 5/2014 | A61M 16/0051 |
| CN | 116732549 | A | * | 9/2023 | C25B 1/02 |
| DE | 3511436 | A1 | | 10/1986 | |
| DE | 3707643 | A1 | | 9/1988 | |
| DE | 102017008304 | A1 | | 3/2019 | |
| DE | 102020007388 | A1 | * | 6/2022 | F24H 3/00 |
| DE | 102021126645 | A1 | * | 4/2023 | E04H 4/1209 |
| EP | 0121500 | A2 | * | 10/1984 | A61H 33/063 |
| EP | 3545999 | A1 | * | 10/2019 | A61M 13/003 |
| EP | 4339338 | A2 | * | 3/2024 | C25B 15/083 |
| GB | 2483552 | A | * | 3/2012 | B05B 17/0607 |
| IR | 112184 | B | | 1/2025 | |
| KR | 20240121742 | A | * | 8/2024 | C25B 1/04 |
| WO | WO-2012032338 | A1 | * | 3/2012 | B05B 17/0607 |
| WO | WO-2020179973 | A1 | * | 9/2020 | A61L 9/04 |

* cited by examiner

HYDROGEN-INFUSED ELECTROLYTIC AEROSOL WELLNESS SYSTEM

TECHNICAL FIELD

The present disclosure relates to aerosol generation systems for wellness applications.

BACKGROUND

Aerosol generation systems for wellness applications typically produce simple water vapor or mist without incorporating therapeutic compounds or bioactive elements. These conventional systems lack the ability to generate hydrogen-infused electrolytic aerosols that combine mineral supplementation, hydrogen therapy, and light activation for enhanced therapeutic benefits.

SUMMARY

According to the World Health Organization, over two billion people worldwide suffer from mineral deficiencies, particularly magnesium deficiency, which affects approximately seventy-five percent of the population in developed countries. Traditional methods of mineral supplementation through oral intake often result in poor bioavailability, with absorption rates as low as twenty to thirty percent. Additionally, there is growing support for molecular hydrogen's therapeutic benefits, which has led to increased interest in hydrogen therapy. However, existing mineral supplementation delivery methods, such as hydrogen water or gas inhalation, have limitations (e.g., efficacy and/or convenience). The present disclosure addresses these challenges and limitations by providing a novel system (and associated method(s)) that combines electrolytic mineral delivery with hydrogen therapy through an innovative aerosol generation approach, potentially offering superior bioavailability and therapeutic efficacy compared to conventional methods.

According to an aspect of the present disclosure, a system for generating a hydrogen-infused electrolytic aerosol for wellness is provided. The system includes an enclosure, a water tank containing water, and an electrolytic mineral solution dispenser configured to dispense an electrolytic mineral solution into the water, wherein the water with the electrolyte mineral solution forms an aqueous electrolyte solution. The system may include at least one ultrasonic transducer in the water tank, the ultrasonic transducer configured to form a vapor cloud of the aqueous electrolyte solution. The system may include a hydrogen generation unit incorporating at least one of a proton exchange membrane (PEM) cell or a solid polymer electrolysis (SPE) cell configured to generate hydrogen gas. The system may include a mixing chamber configured to combine the vapor cloud of the aqueous electrolyte solution and the hydrogen gas. The system may include a conveyance path configured to move the vapor cloud into the enclosure where a human, animal, object, plant, edible item, or the like is exposed to the vapor cloud. The system may include a first light source configured to emit light and to illuminate the vapor cloud and thereby improve bioavailability of the minerals and/or hydrogen.

According to other aspects of the present disclosure, the system may include one or more of the following features: an enclosure configured to receive a human; an electrolytic mineral solution that may comprise a plurality of electrolytic mineral elements (e.g., a chloride, a magnesium chloride, or other element(s)). A concentration of magnesium chloride may be greater than a concentration of magnesium chloride in seawater. The first light source may comprise at least one of infrared light and ultraviolet light. The system may further comprise a blower in fluid communication with the conveyance path, the blower configured to direct the vapor cloud into the enclosure. The enclosure may be selected from the group comprising an infrared sauna, a sensory deprivation flotation tank, a sauna box, and a fabric enclosure. The enclosure may be a fabric enclosure comprising a reflective surface. The system may further comprise a controller configured to adjust at least one of a concentration of the electrolytic mineral solution, an output of the ultrasonic transducer, a hydrogen generation rate of the hydrogen generation unit, and an intensity of the light source. The controller may be further configured to monitor and maintain a specific water level in the water tank to ensure coverage of the ultrasonic transducer. The system may further comprise a control panel on a base unit for adjusting system parameters.

According to another aspect of the present disclosure, a method for generating a hydrogen-infused electrolytic aerosol for wellness is provided. The method may include providing an enclosure. The method may include filling a water tank with water. The method may include dispensing an electrolytic mineral solution into the water using an electrolytic mineral solution dispenser. The method may include forming a vapor cloud of the water and the electrolytic mineral solution using at least one ultrasonic transducer in the water tank. The method may include generating hydrogen gas using a hydrogen generation unit comprising at least one of a proton exchange membrane (PEM) cell or a solid polymer electrolysis (SPE) cell. The method may include combining the vapor cloud of the water and electrolytic mineral solution with the hydrogen gas in a mixing chamber. The method may include moving the vapor cloud into the enclosure through a conveyance path. The method may include illuminating the vapor cloud inside the enclosure using a light source configured to emit full-spectrum light.

According to other aspects of the present disclosure, the method may include one or more of the following features. The method may further comprise adjusting a concentration of the electrolytic mineral solution based on user preferences or predetermined wellness protocols. The full-spectrum light may comprise at least one of infrared light and ultraviolet light, and the method may further comprise controlling intensity and duration of the full-spectrum light exposure based on user-specific treatment parameters. The method may further comprise monitoring and maintaining a specific water level in the water tank to ensure coverage of the ultrasonic transducer and extraction of the vapor cloud. In one configuration, the enclosure may be a fabric enclosure, and the method may further comprise configuring the fabric enclosure with a reflective inner surface to enhance the distribution of the full-spectrum light within the enclosure. The method may further comprise controlling a flow rate of the vapor cloud into the enclosure using a blower in fluid communication with the conveyance path, wherein the flow rate may be adjusted based on user comfort and treatment efficacy.

According to yet another aspect of the present disclosure, a method of operating a hydrogen-infused electrolytic aerosol system is provided. The method may include filling a water reservoir in a base unit with water. The method may include dispensing an electrolytic mineral solution into the water. The method may include activating an ultrasonic transducer to generate a vapor cloud from the mineral-infused water. The method may include generating hydrogen gas using a hydrogen gas generator. The method may include mixing the vapor cloud and hydrogen gas in a mixing chamber. The method may include extending a conveyance path (e.g., a telescoping tube) connected to the base unit. The method may include conveying the mixed vapor cloud and hydrogen gas through an internal channel in the conveyance path (e.g., telescoping tube). The method may include releasing the hydrogen-infused electrolytic aerosol from a vent positioned in the enclosure and connected to the conveyance path (e.g., telescoping tube). The method may include adjusting system parameters using a control panel on the base unit.

Further areas of applicability of the present disclosure will become apparent from the detailed description provided hereinafter. The detailed description and specific examples, while providing various configurations, are intended for illustrative purposes only and are not intended to limit the scope of the disclosure necessarily.

BRIEF DESCRIPTION OF THE DRAWINGS

The accompanying figures of the drawing, which are included to provide a further understanding of general aspects of the system/method, are incorporated in and constitute a part of this specification. These illustrative aspects of the system/method, together with the detailed description, explain the principles of the system. No attempt is made to show structural details in more detail than is necessary for a fundamental understanding of the system and the various ways in which it is practiced. The following figures of the drawing include.

Figure 1:
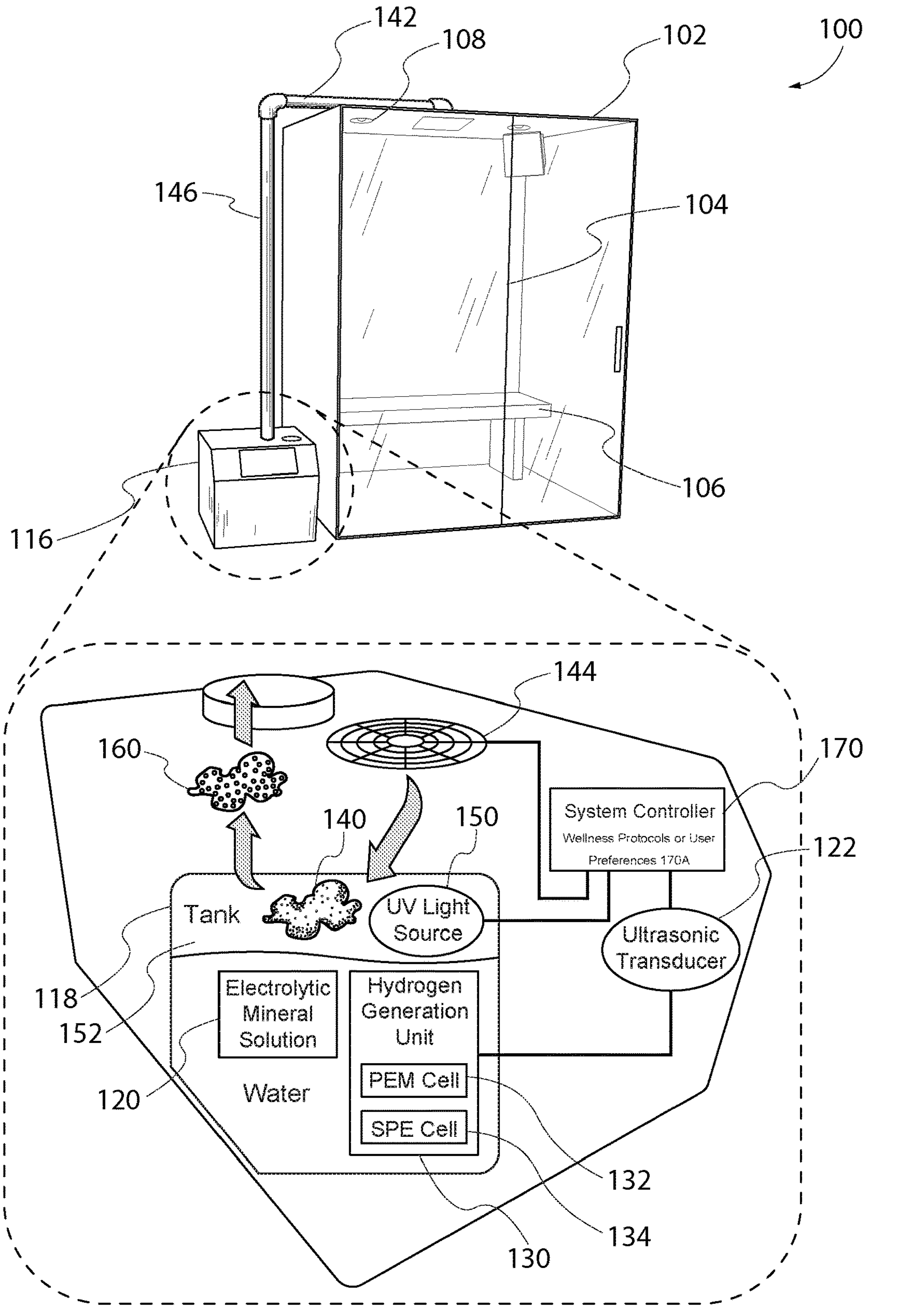
FIG. 1 illustrates an isometric view of a hydrogen-infused electrolytic aerosol wellness system with an enclosure, and a schematic illustrating components in a base unit.

In the appended figures, similar components and/or features may have the same reference label. Further, various components of the same type may be distinguished by following the reference label with a dash and a second label that distinguishes among the similar components. If only the first reference label is used in the specification, the description is applicable to any one of the similar components having the same first reference label, irrespective of the second reference label. Where the reference label is used in the specification, the description is applicable to any one of the similar components having the same reference label.

DETAILED DESCRIPTION

Illustrative configurations are described while referencing accompanying figures (e.g., FIGS. 1-11). Wherever convenient, the same reference numbers are used throughout the drawings to refer to the same or similar parts. While examples and features of disclosed principles are described herein, modifications, adaptations, and other implementations are possible without departing from the spirit and scope of the disclosed configurations. It is intended that the following detailed description be considered as illustrative only—the true scope and spirit of the system(s)/method(s) indicated by the following claims (and new claims in this disclosure or continuations thereof).

Many individuals suffer from mineral deficiencies, dehydration, and oxidative stress, which can lead to various health issues and reduced overall wellness. These problems often stem from inadequate intake of essential minerals, consumption of low-quality water, and exposure to environmental toxins. Traditional methods of addressing these concerns, such as oral supplements or standard hydration techniques, may have limited effectiveness due to poor absorption or inability to target cellular-level processes. The human body requires a complex balance of electrolytic minerals to maintain proper cellular function, fluid balance, and energy production. When this balance becomes disrupted, individuals may experience fatigue, compromised immune function, and accelerated aging processes. Additionally, oxidative stress from free radical accumulation can damage cellular structures and interfere with normal metabolic processes, creating a cascade of health challenges that conventional approaches struggle to address comprehensively.

To address these challenges, a hydrogen-infused electrolytic aerosol generation system is disclosed that creates a comprehensive wellness solution. The system utilizes an electrolytic mineral solution, ultrasonic atomization, hydrogen gas generation, and infrared and/or full-spectrum light exposure to produce a bioactive aerosol. This aerosol is designed to deliver essential minerals and hydrogen in a highly absorbable form, potentially enhancing cellular hydration, reducing oxidative stress, and improving overall mineral balance in the body. The system integrates multiple therapeutic modalities, including electrolytic mineral supplementation, hydrogen therapy, light therapy, and aerosol delivery into a single platform. By creating sub-micron particles with low surface tension, the system enables enhanced penetration through biological membranes (e.g., a human's skin), allowing for direct cellular uptake of beneficial compounds. The versatile design allows for application in various settings, including personal wellness spaces, therapeutic environments, and agricultural applications, providing a multifaceted approach to addressing common health and wellness concerns related to mineral deficiencies, dehydration, and oxidative stress.

FIG. 1 illustrates an isometric view of an aerosol wellness system 100 configured for generating hydrogen-infused electrolytic aerosol for wellness applications. The aerosol wellness system 100 includes an enclosure 102 that can be configured to receive one or more humans for therapeutic treatment sessions. The enclosure 102 provides a controlled environment where users can be exposed to the generated hydrogen-infused electrolytic aerosol under specific conditions. A door 104 provides access to the interior space of the enclosure 102, allowing users to enter and exit the treatment area while maintaining containment of the aerosol during operation. The door 104 can be constructed from materials that provide adequate sealing properties to prevent unwanted aerosol escape while ensuring user safety and comfort. A bench 106 may be positioned within the enclosure 102 to provide seating or support for users during treatment sessions. The bench 106 can be constructed from materials that are compatible with the aerosol environment and can withstand exposure to an electrolytic mineral solution 120 and hydrogen gas without degradation. Additionally, a traditional light 108 may be incorporated within the enclosure 102 to provide general illumination for user visibility and safety during entry, exit, and treatment procedures.

The aerosol wellness system 100 further includes a housing 116 (also referred to herein as a base unit 116) that contains various operational components and subsystems disclosed for aerosol generation and delivery. The housing 116 provides structural support and protection for internal components while facilitating proper airflow and aerosol distribution throughout the system. In an illustrative configuration, the housing 116 incorporates a tank 118 (also referred to as reservoir 118) that serves as a water tank containing water for the aerosol generation process. The tank 118 provides a reservoir for receiving or holding the water and other substance(s), as described herein, that are consumed to create a vapor cloud. The tank 118 is constructed from materials that are chemically compatible with the electrolytic mineral solution and can maintain structural integrity under operational conditions.

Referring still to FIG. 1, an ultrasonic transducer 122 may be positioned within the water tank 118 to facilitate the formation of a vapor cloud 140, 160 (described later herein) from the aqueous electrolyte solution. The ultrasonic transducer 122 operates at a frequency of 2.4 MHz, which provides optimal atomization and aerosolization of the electrolytic mineral solution mixed with water. This specific frequency enables the ultrasonic transducer 122 to generate mechanical vibration energy that effectively breaks down the aqueous electrolyte solution into fine particles suitable for aerosol formation. It should be noted that the ultrasonic transducer 122 may generate other frequencies that are slower or faster (e.g., 1 MHz to 3.8 MHz or other frequencies practiced in industry). The ultrasonic transducer 122 includes stainless steel discs that may be positioned at the bottom of the water tank 118, providing enhanced durability and performance in the electrolytic environment. The stainless steel construction resists corrosion from the mineral-rich solution while maintaining consistent ultrasonic energy transmission throughout extended operation periods.

A system controller 170 may be connected to the ultrasonic transducer 122 to regulate the frequency output and power delivery during vapor generation. The controller 170 can modulate the ultrasonic energy based on the desired vapor cloud density and the specific characteristics of the electrolytic mineral solution being processed. The positioning of the ultrasonic transducer 122 at the bottom of the water tank 118 allows for direct contact with the aqueous electrolyte solution, maximizing energy transfer efficiency and promoting uniform vapor formation across the solution surface. The stainless steel discs of the ultrasonic transducer 122 create cavitation bubbles within the aqueous electrolyte solution, which collapse and generate the fine mist particles that form the vapor cloud 160.

The system includes specific water level coverage requirements over the ultrasonic transducer 122 to optimize vapor cloud generation and maintain consistent performance. The water level within the water tank 118 may be maintained at a predetermined height above the ultrasonic transducer 122 to ensure complete submersion of the stainless steel discs while providing adequate solution volume for continuous vapor production. Additionally, the extraction tube height above the water level may be configured to optimize the collection and conveyance of the vapor cloud 160 generated by the ultrasonic transducer 122. This specific positioning prevents liquid carryover while maximizing the capture of the atomized particles that comprise the vapor cloud 160.

In an illustrative configuration, the vapor cloud 160 formed by the ultrasonic transducer 122 includes sub-micron particles of the electrolytic mineral solution suspended in the air space above the aqueous electrolyte solution. The ultrasonic energy from the transducer creates a fine mist through high-frequency vibrations that break the surface tension of the aqueous electrolyte solution, releasing microscopic droplets into the surrounding atmosphere. The vapor cloud 160 maintains the mineral composition and electrical properties of the original electrolytic mineral solution while existing in an aerosolized form that can be easily transported through the conveyance path. The formation process occurs continuously as long as the ultrasonic transducer 122 remains energized and the water level coverage remains within the specified parameters for optimal operation.

With continued reference to FIG. 1, a hydrogen generation unit 130 may be positioned within the water tank 118 to produce hydrogen gas for infusion into the vapor cloud 160. The hydrogen generation unit 130 includes advanced electrolysis technologies that enable efficient hydrogen production directly within the aqueous electrolyte solution. In some cases, the hydrogen generation unit 130 operates continuously during system operation to maintain consistent hydrogen levels in the generated aerosol. The positioning of the hydrogen generation unit 130 within the water tank 118 allows for immediate integration of the produced hydrogen gas with the electrolytic mineral solution, creating a homogeneous mixture that enhances the bioactivity of the resulting vapor cloud 160.

The hydrogen generation unit 130 may include a proton exchange membrane (PEM) cell 132 that utilizes polymer electrolyte membrane technology for hydrogen production. The PEM cell 132 operates through an electrochemical process where water molecules are split into hydrogen and oxygen ions at the membrane interface. In some cases, the PEM cell 132 includes platinum-based catalysts that facilitate the electrochemical reactions at relatively low operating temperatures. The PEM cell 132 may be configured to operate efficiently in the electrolytic mineral solution environment, where the presence of conductive ions enhances the electrochemical processes. Additionally, the PEM cell 132 can be designed with specific membrane characteristics that optimize hydrogen production rates while maintaining durability in the mineral-rich aqueous environment.

With continued reference to FIG. 1, the hydrogen generation unit 130 may alternatively, or additionally, include a solid polymer electrolysis (SPE) cell 134 configured to generate hydrogen gas through solid-state electrochemical processes. The SPE cell 134 utilizes solid polymer electrolyte materials that conduct protons while blocking electron transfer, enabling efficient water electrolysis. In some cases, the SPE cell 134 operates at higher current densities compared to traditional electrolysis methods, resulting in increased hydrogen production rates. The SPE cell 134 may be constructed with corrosion-resistant materials that withstand prolonged exposure to the electrolytic mineral solution. Moreover, the SPE cell 134 can be configured with multiple electrode assemblies to maximize the surface area available for electrochemical reactions, thereby enhancing overall hydrogen generation efficiency.

In an illustrative configuration, both the PEM cell 132 and the SPE cell 134 may operate simultaneously within the hydrogen generation unit 130 to maximize hydrogen gas production. The dual-cell configuration allows for redundancy in hydrogen generation and can provide higher total gas output compared to single-cell systems. In some cases, the PEM cell 132 and SPE cell 134 may be operated at different voltage levels to optimize their respective electrochemical processes. The hydrogen generation unit 130 may include electrical connections and control circuits that manage the power distribution between the PEM cell 132 and the SPE cell 134. Furthermore, the positioning of both cells within the water tank 118 enables direct contact with the aqueous electrolyte solution, facilitating immediate dissolution and distribution of the generated hydrogen gas throughout the liquid medium before atomization by the ultrasonic transducer 122.

Referring to FIG. 1, the aerosol wellness system 100 includes a mixing chamber 152 configured to combine the vapor cloud 160 of the aqueous electrolyte solution and the hydrogen gas generated by the hydrogen generation unit 130. The mixing chamber 152 may be positioned within the housing 116 and can be configured to facilitate thorough integration of the vapor cloud 160 with the hydrogen gas produced by the PEM cell 132 or SPE cell 134. In some cases, the mixing chamber 152 operates by creating turbulent flow conditions that promote uniform distribution of hydrogen gas throughout the vapor cloud 160. The mixing chamber 152 may include internal baffles or flow directors that enhance the mixing process and ensure consistent hydrogen concentration throughout the resulting aerosol. Additionally, the mixing chamber 152 can be designed with specific volumetric dimensions to provide adequate residence time for complete integration of the vapor and gas components.

The system 100 further includes a conveyance path configured to move the vapor cloud 160 into the enclosure 102. As shown in FIG. 1, a flow path 142 (also referred to herein as a conveyance path 142) extends from the mixing chamber and provides a conduit for transporting the hydrogen-infused electrolytic aerosol from the generation components to the enclosure 102. The flow path 142 may be constructed from materials that resist corrosion from the electrolytic solution and can maintain structural integrity under varying pressure conditions. In some cases, the flow path 142 includes multiple segments (e.g. a telescoping pole 146)_that can be configured with different diameters to optimize flow characteristics and minimize pressure losses during aerosol transport. The conveyance path may also incorporate flow straighteners or laminar flow elements to reduce turbulence and maintain aerosol particle integrity during transport.

With continued reference to FIG. 1, the system 100 includes a fan 144 in fluid communication with the conveyance path. The fan 144 may be configured to direct the vapor cloud 160 into the enclosure 102 and can provide the motive force for aerosol movement through the flow path 142. The fan 144 may be positioned downstream of the mixing chamber 152 to draw the hydrogen-infused aerosol through the conveyance system. In some cases, the fan 144 operates at variable speeds to control the flow rate of aerosol delivery to the enclosure 102. The fan 144 can include specific delivery angles designed to reduce turbulence and increase atomized vapor cloud production, thereby enhancing the efficiency of aerosol distribution within the enclosure 102.

In an illustrative configuration, the fan 144 may be equipped with aerodynamically designed blades that minimize air disturbance while maximizing flow volume. The fan 144 can be configured with adjustable pitch angles that allow for optimization of airflow characteristics based on the specific requirements of the aerosol delivery system. Moreover, the fan 144 may include variable speed controls that enable precise regulation of aerosol flow rates to match the capacity of the enclosure 102 and the desired concentration levels for wellness applications. The fan 144 can also be designed with noise reduction features to maintain a quiet operating environment within the enclosure 102 during aerosol delivery operations. The system controller 170 manages the operation of various components within the aerosol wellness system 100, coordinating the timing and intensity of aerosol generation, light exposure, and environmental controls. The system controller 170 can include programmable logic controllers, sensors, and user interface components that allow for customization of treatment parameters based on specific wellness protocols or user preferences 170A.

Referring to FIG. 1, a first light source 150 may be positioned within the mixing chamber 152 of the aerosol wellness system 100 to provide illumination of the vapor cloud 140, 160. The first light source 150 can be configured to emit light across multiple spectrums to enhance the properties of the hydrogen-infused electrolytic aerosol. In some cases, the first light source 150 includes infrared light and ultraviolet light components that create photoelectric and photovoltaic effects to polarize the vapor cloud 160. The positioning of the first light source 150 within the enclosure 102 allows for direct interaction between the emitted light and the aerosol particles as the vapor cloud 140, 160 circulates through the system. The photoelectric effects generated by the first light source 150 may facilitate the conversion of light energy into electrical energy within the electrolytic mineral particles, while the photovoltaic effects can enable the conversion of electrons to photons and vice versa.

The magnesium chloride component within the electrolytic mineral solution may enable conversion of electrons to photons and vice versa, similar to photovoltaic cell applications. This conversion process can be enhanced through the interaction with the first light source 150, particularly when the light source includes both infrared and ultraviolet wavelengths. The magnesium chloride particles suspended within the vapor cloud 160 may act as microscopic photovoltaic elements that respond to the light energy emitted by the first light source 150. Additionally, the chloride ions present in the electrolytic mineral solution can provide the oxidation-reduction potential charge that works in conjunction with the light exposure to create enhanced electrical activity within the aerosol particles. The combination of magnesium chloride and targeted light wavelengths may result in increased bioactivity of the vapor cloud 160 as the aerosol moves through the conveyance path 142.

With continued reference to FIG. 1, the first light source 150 may be configured to emit full-spectrum light that includes both infrared and ultraviolet components. The infrared light portion of the spectrum can penetrate deeply into the vapor cloud 160 and may provide thermal energy that enhances the mobility and reactivity of the electrolytic mineral particles. The ultraviolet light component may create photochemical reactions within the aerosol that can increase the electrical charge and polarization of the suspended particles. The full-spectrum nature of the first light source 150 allows for comprehensive activation of the hydrogen-infused electrolytic aerosol across multiple wavelengths simultaneously. The intensity and duration of the full-spectrum light exposure can be controlled based on user-specific treatment parameters, allowing for customization of the aerosol activation process. This controllability may enable optimization of the photoelectric and photovoltaic effects for different applications or user preferences.

Figure 2:
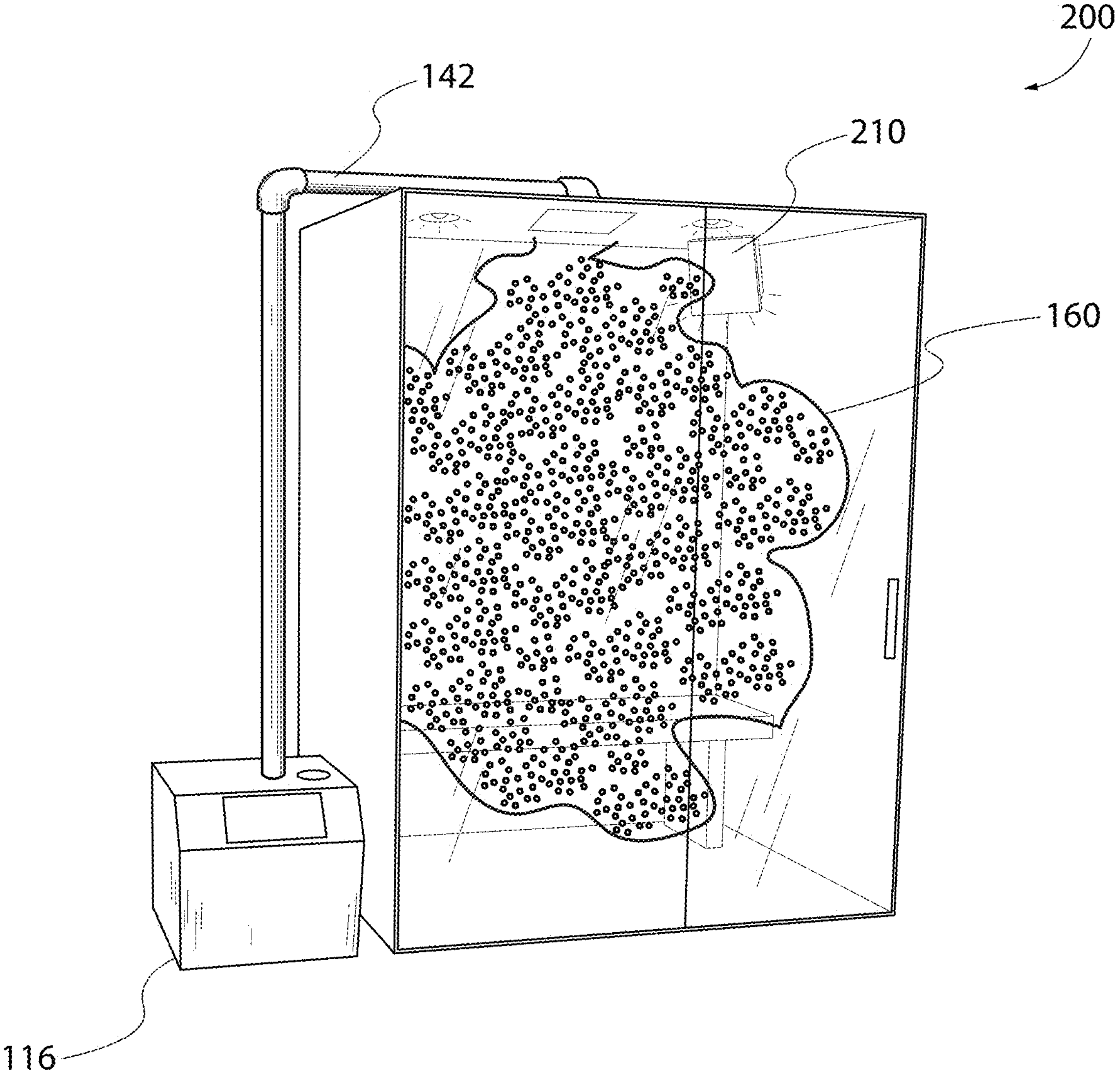
FIG. 2 illustrates a system diagram of a hydrogen-infused electrolytic aerosol generation system with a secondary light source provided to activate vapor inside an enclosure.

FIG. 2 illustrates an operating system 200 that manages various functional aspects of the hydrogen-infused electrolytic aerosol generation system. The operating system 200 includes control algorithms that regulate the interaction between multiple system components to maintain optimal performance parameters. The operating system 200 can be configured to monitor real-time operational data from sensors positioned throughout the system, including temperature readings, vapor density measurements, and electrical conductivity levels of the aqueous electrolyte solution. Additionally, the operating system 200 may include user interface capabilities that allow operators to input specific treatment protocols or wellness parameters based on individual user requirements. The operating system 200 can also store historical operational data to enable predictive maintenance scheduling and performance optimization over extended periods of use.

As further shown in FIG. 2, a secondary light source 210 may be incorporated into the operating system 200 to provide additional illumination capabilities (in addition to the first light source 150, FIG. 1). The secondary light source 210 can work in conjunction with the first light source 150 to create enhanced polarization effects within the vapor cloud 160. The positioning of multiple light sources throughout the system allows for more comprehensive coverage and activation of the aerosol particles as the vapor cloud 160 moves through different zones of the system. The secondary light source 210 may emit complementary wavelengths that work synergistically with the first light source 150 to maximize the photoelectric and photovoltaic effects. In some cases, the secondary light source 210 can be configured to emit specific wavelengths that target particular aspects of the electrolytic mineral composition, such as enhancing the electron-to-photon conversion properties of the magnesium chloride component.

Figure 3:
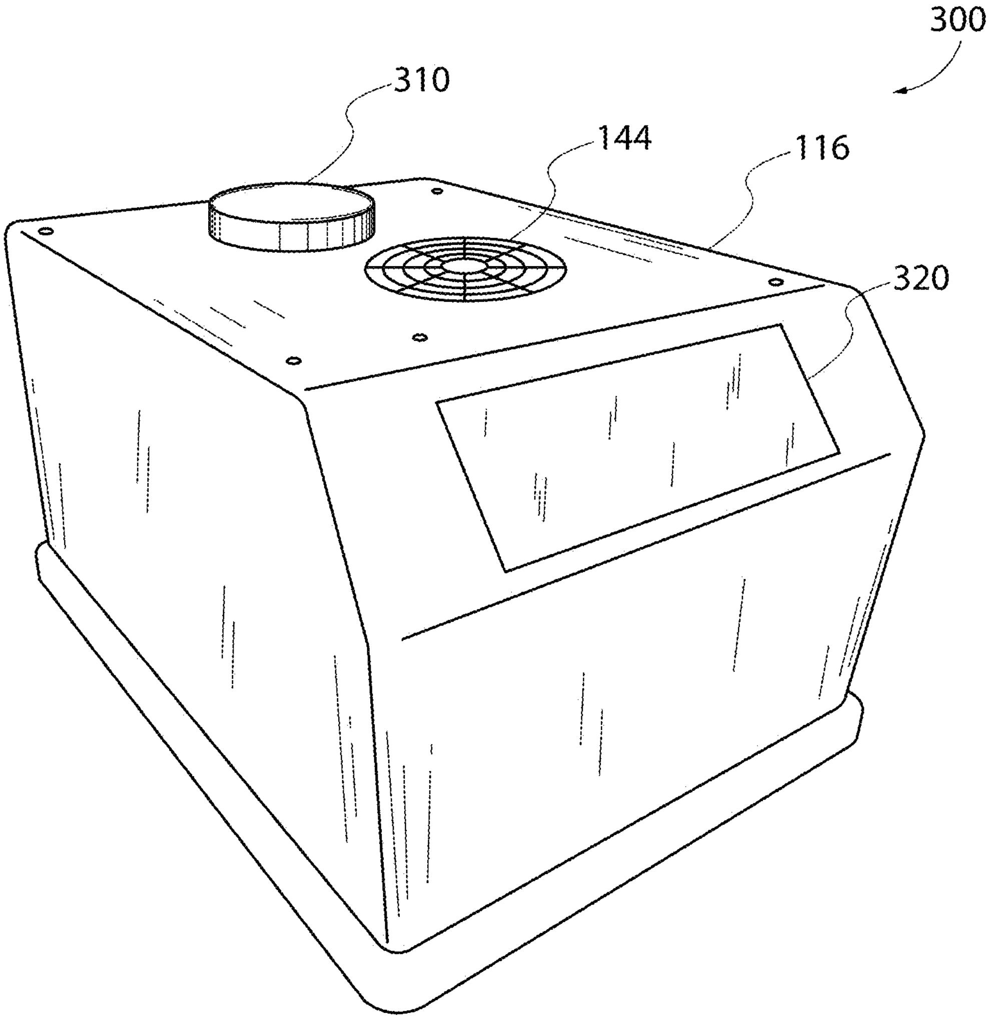
FIG. 3 illustrates an isometric view of a hydrogen-infused electrolytic aerosol generation system (sometimes referred to herein as a base unit) with a vapor outlet.

FIG. 3 illustrates an isometric view 300 of the hydrogen-infused electrolytic aerosol generation system (sometimes referred to herein as a base unit) with a vapor outlet 310. The vapor outlet 310 provides a controlled release point for the hydrogen-infused electrolytic aerosol. The vapor outlet 310 may be positioned at the terminus of the flow path 142 (FIG. 1) and can be configured with specific geometric features to optimize aerosol dispersion patterns within the enclosure 102. The vapor outlet 310 can include adjustable nozzles or diffusers that modify the spray pattern and particle size distribution of the released aerosol. In some cases, the vapor outlet 310 incorporates directional elements that guide the aerosol flow toward specific areas within the enclosure 102 to enhance user exposure and treatment effectiveness.

The system further includes a screen 320 that may be positioned within the conveyance path to filter particulates or regulate aerosol flow characteristics. The screen 320 can be constructed from corrosion-resistant materials and may include mesh openings sized to remove unwanted particles while allowing the hydrogen-infused aerosol to pass through unimpeded. In some cases, the screen 320 serves as a flow conditioning element that helps to create uniform velocity profiles across the cross-section of the flow path 142. The screen 320 may also function as a safety feature to prevent backflow of aerosol components and can be designed for easy removal and cleaning to maintain system performance over extended operating periods.

Figure 4:
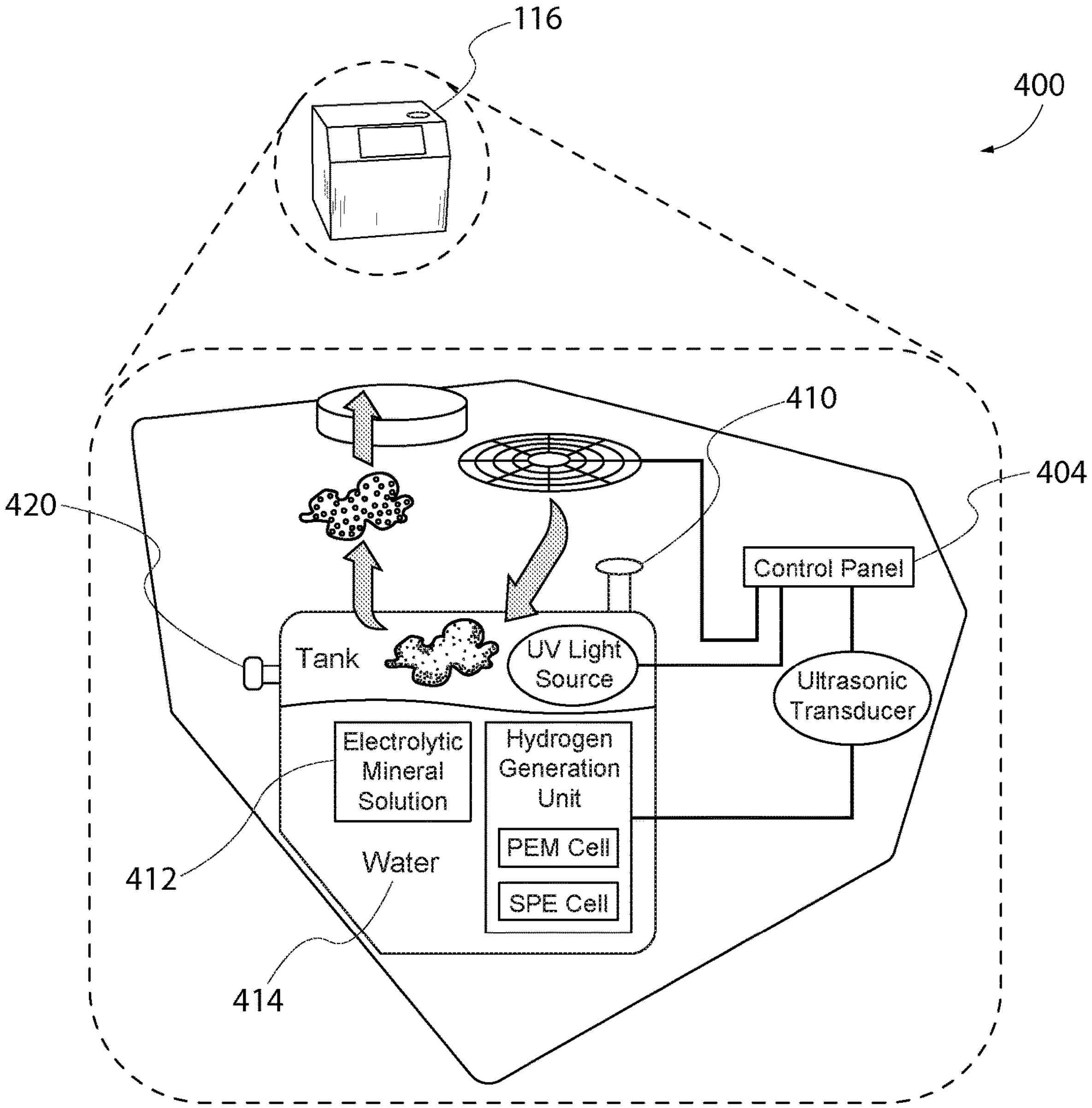
FIG. 4 illustrates a schematic diagram of a hydrogen-infused electrolytic aerosol generation system with a fill port and water level sensor.

FIG. 4 illustrates a schematic diagram of system 400 showing the electrolytic mineral solution composition and dosing configuration. The system 400 includes a fill port 410 (also referred to as electrolytic mineral solution dispenser 410) that allows the introduction of components into the water tank 118. An electrolytic mineral solution 412 (corresponding to the electrolytic mineral solution 120, as shown in FIG. 1) may be dispensed through the fill port 410, while water 414 (also referred to as mineral-infused water 414) provides the base medium for creating the aqueous electrolyte solution. The water level sensor 420 monitors the liquid level to maintain proper coverage of the ultrasonic transducer 122 and optimize vapor cloud generation.

The electrolytic mineral solution 412 includes a plurality of electrolytic mineral elements that provide the foundation for the hydrogen-infused aerosol generation process. In an illustrative configuration, the electrolytic mineral solution 412 may include 78 specific electrolytic mineral elements that are concentrated at levels approximately 4800% greater than those found in natural seawater. The electrolytic mineral solution 412 includes chloride and magnesium chloride as primary components, along with 76 additional mineral elements that contribute to the bioactive properties of the generated aerosol. The concentration of magnesium chloride in the electrolytic mineral solution 412 may be substantially greater than the concentration of magnesium chloride found in seawater, providing enhanced conductivity and photonic conversion capabilities. While many man-made and/or natural sources of the electrolytic mineral solution 412 may be utilized, one source of the solution is a lake that receives continuous inflow from a tributary that deposits dissolved minerals each year. The lake may accumulate these minerals due to evaporation and continuous deposition, which may give rise to highly saline waters enriched in sodium and chloride as primary constituents, with significant concentrations of sulfate, magnesium, potassium, and calcium. Through evaporation and mineral saturation processes, crystalline deposits such as halite (sodium chloride), gypsum (calcium sulfate), and mirabilite (sodium sulfate) precipitate, while oolitic carbonate grains form in wave-agitated zones.

With continued reference to FIG. 4 illustrating the system 400 with an integrated control architecture (e.g. a control panel 404) for monitoring and adjusting system parameters, the system 400 may include interconnected relationships between various control elements that work together to maintain system stability and performance. Within the system 400, control pathways are disclosed that enable automated adjustment of multiple operational variables simultaneously. The system 400 can include feedback loops that allow the system to self-correct based on measured performance indicators, thereby reducing the need for manual intervention during operation. Moreover, the system 400 may incorporate safety protocols that automatically shut down specific components if operational parameters exceed predetermined thresholds.

In an illustrative configuration, the system includes a controller (e.g., system controller 170, FIG. 1) that can be configured to adjust a concentration of the electrolytic mineral solution based on real-time analysis of vapor cloud density and electrical conductivity measurements. The controller may also regulate the output of the ultrasonic transducer by modifying the frequency, amplitude, or duty cycle of the ultrasonic waves generated within the water tank. Furthermore, the controller can manage the hydrogen generation rate of the hydrogen generation unit by adjusting the electrical current supplied to the PEM cell or SPE cell components. The controller may additionally control the intensity of the light source by varying the electrical power delivered to the illumination elements, allowing for customized light therapy protocols. These control capabilities enable the system to adapt to different user preferences or predetermined wellness protocols while maintaining consistent aerosol quality and delivery.

With continued reference to FIG. 4, a water level sensor 420 provides continuous monitoring of liquid levels within the water tank to ensure proper coverage of the ultrasonic transducer components. The water level sensor 420 can be positioned at one or more heights within the tank to provide graduated level detection and early warning of low water conditions. The water level sensor 420 may utilize capacitive, ultrasonic, or optical sensing technologies to accurately measure water levels regardless of the electrical conductivity of the aqueous electrolyte solution. Additionally, the water level sensor 420 can communicate with the controller to trigger automatic water replenishment systems or alert operators when manual refilling becomes necessary. The water level sensor 420 may also monitor the extraction of the vapor cloud by detecting changes in water level that correspond to the atomization rate of the ultrasonic transducer.

The system further includes the control panel 404 on a base unit for adjusting system parameters through a user-accessible interface. The control panel 404 can include digital displays that show real-time operational status, including current electrolyte concentration levels, hydrogen generation rates, and vapor cloud density measurements. The control panel 404 may incorporate touch-screen technology or physical controls such as rotary encoders and push-button switches to enable precise parameter adjustment. Additionally, the control panel 404 can provide visual and audible alerts when system maintenance is required or when operational parameters fall outside acceptable ranges. The control panel 404 may also include preset program selections that automatically configure multiple system parameters for specific wellness applications or treatment protocols.

With continued reference to FIG. 4, the electrolytic mineral solution dispenser operates at precise dosing parameters to maintain optimal concentration levels within the water tank 118. The electrolytic mineral solution 412 may be dosed at a concentration of 10 milliliters per gallon of water 414 to achieve the desired electrolytic properties. This precise dosing ratio ensures that the water 414 with the electrolytic mineral solution 412 forms an aqueous electrolyte solution with appropriate conductivity and mineral content for effective atomization and hydrogen infusion. The fill port 410 allows controlled introduction of the electrolytic mineral solution 412, while the water level sensor 420 provides feedback to maintain consistent concentration levels throughout operation.

In an illustrative configuration, the magnesium chloride component within the electrolytic mineral solution 412 enables conversion of electrons to photons and vice versa, similar to processes utilized in photovoltaic cell applications. The chloride elements provide negative oxidation-reduction potential charge characteristics that contribute to the electrical properties of the generated vapor cloud 160. Additionally, the additional supplementary mineral elements (e.g., 6, 12, 38, 76, or any variety of elements) within the electrolytic mineral solution 412 function as crystalloid components that enhance the conductivity and bioavailability of the resulting aerosol. The water 414 serves as the carrier medium, allowing the electrolytic mineral elements to dissolve and form the conductive aqueous electrolyte solution that may be effectively atomized by the ultrasonic transducer 122.

In an illustrative configuration, the controller can be configured to monitor and maintain a specific water level in the water tank to ensure coverage of the ultrasonic transducer during all operational phases. The monitoring function may include continuous level sensing with automatic alerts when water levels approach minimum operational thresholds. The controller can also coordinate with automated water supply systems to maintain optimal water levels without interrupting system operation. Furthermore, the controller may adjust the positioning of internal components or modify operational parameters to compensate for varying water levels while maintaining consistent vapor cloud generation. The controller can additionally track water consumption patterns to predict refill requirements and schedule maintenance activities during periods of reduced system utilization.

Figure 5:
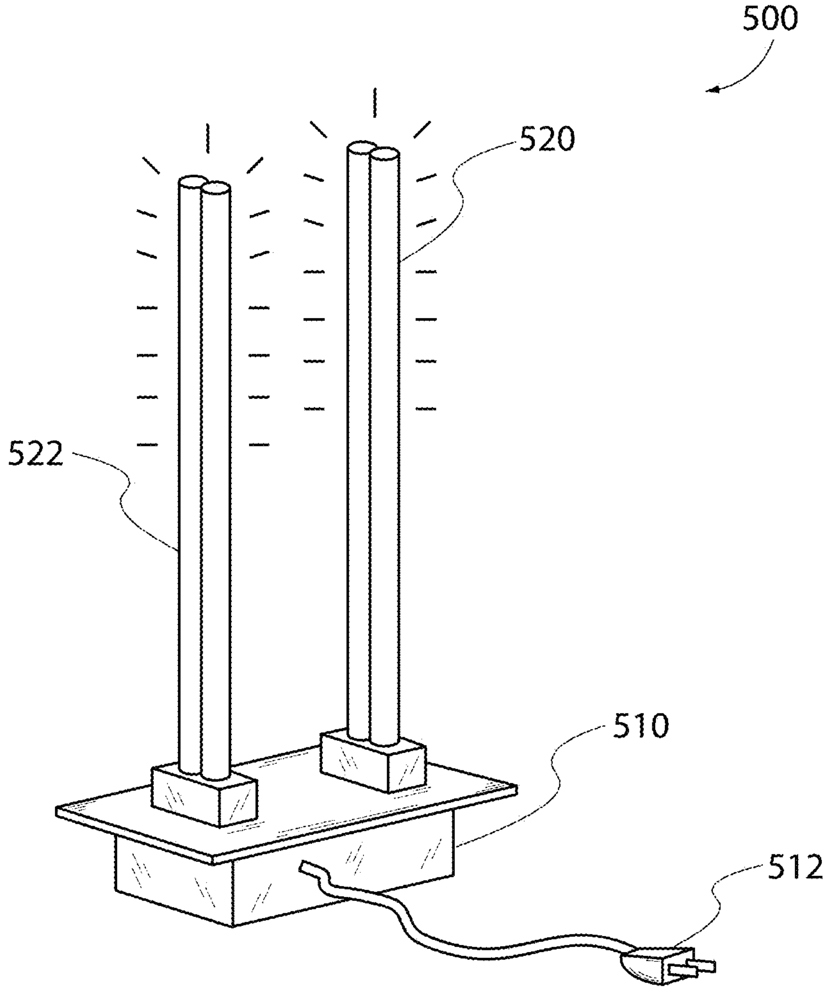
FIG. 5 illustrates a system diagram of a light assembly (for providing specific or broad-spectrum energy/light) for a hydrogen-infused electrolytic aerosol generation system.

FIG. 5 illustrates a system diagram of a light assembly 500 (for providing specific or broad-spectrum energy/light) for a hydrogen-infused electrolytic aerosol generation system. The light source 500 may be supported by an electronics base 510 that houses the control circuitry and power management components for the illumination system. A power cord 512 extends from the electronics base 510 to provide an electrical connection to an external power supply. The light source 500 may be connected to one or more light tubes 520, 522 that direct the emitted light toward the target area where the vapor cloud interaction occurs. The light tubes 520 can be configured to focus or distribute the light energy in specific patterns to optimize the interaction with the aerosol particles. The electronics base 510 may include control circuits that regulate the intensity, duration, and spectral characteristics of the light output from the light source 500. This configuration allows for precise control over the photoelectric and photovoltaic effects generated within the hydrogen-infused electrolytic aerosol.

The light tubes 520 may be designed to transmit either or both infrared and ultraviolet wavelengths while maintaining the spectral integrity of the emitted light. The material composition of the light tubes 520 can be selected to minimize absorption losses and ensure efficient delivery of the light energy to the vapor cloud interaction zone. Additionally, the light tubes 520 may include optical elements such as lenses or reflectors that shape the light beam to achieve optimal coverage of the aerosol particles. The length and diameter of the light tubes 520 can be configured based on the specific requirements of the system and the desired intensity distribution within the treatment area. The modular design of the light source 500, electronics base 510, and light tubes 520 allows for flexibility in system configuration and maintenance access.

Figure 6:
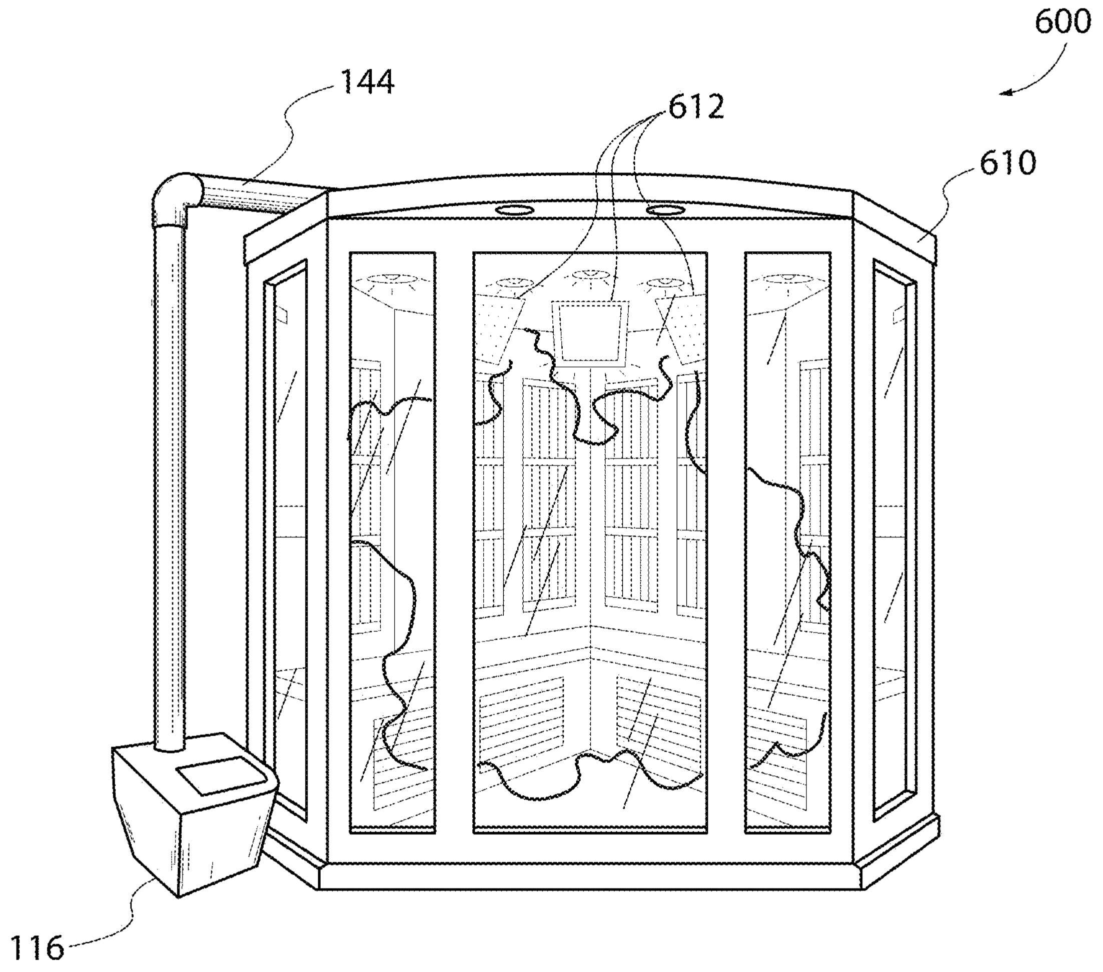
FIG. 6 illustrates a schematic diagram of a hydrogen-infused electrolytic aerosol generation system configured as a spa-type enclosure with wood panels.

FIG. 6 illustrates a spa enclosure 600 configured as an infrared sauna for the hydrogen-infused electrolytic aerosol wellness system. The spa enclosure 600 includes wood panels 610 that form the structural framework and interior surfaces of the infrared sauna configuration. A plurality of secondary lights 612 is positioned within the spa enclosure 600 to provide illumination and therapeutic light exposure during operation. The wood panels 610 may be constructed from cedar, hemlock, or other suitable materials that can withstand the thermal conditions and moisture exposure associated with infrared sauna applications. The plurality of secondary lights 612 may include infrared heating elements, full-spectrum LED arrays, or combinations thereof to create the desired therapeutic environment within the spa enclosure 600.

The spa enclosure 600 demonstrates one configuration where the enclosure can be configured to receive a human for wellness applications. The wood panels 610 provide thermal insulation and create a comfortable environment for extended exposure to the hydrogen-infused electrolytic aerosol. Additionally, the plurality of secondary lights 612 works in conjunction with the primary light source to enhance the photoelectric and photovoltaic effects on the vapor cloud within the spa enclosure 600. The infrared sauna configuration allows for elevated temperatures that may enhance the absorption and therapeutic effects of the hydrogen-infused electrolytic aerosol through increased circulation and perspiration. Moreover, the wood panels 610 may include ventilation features or access ports to facilitate proper air circulation and aerosol distribution throughout the spa enclosure 600.

Figure 7:
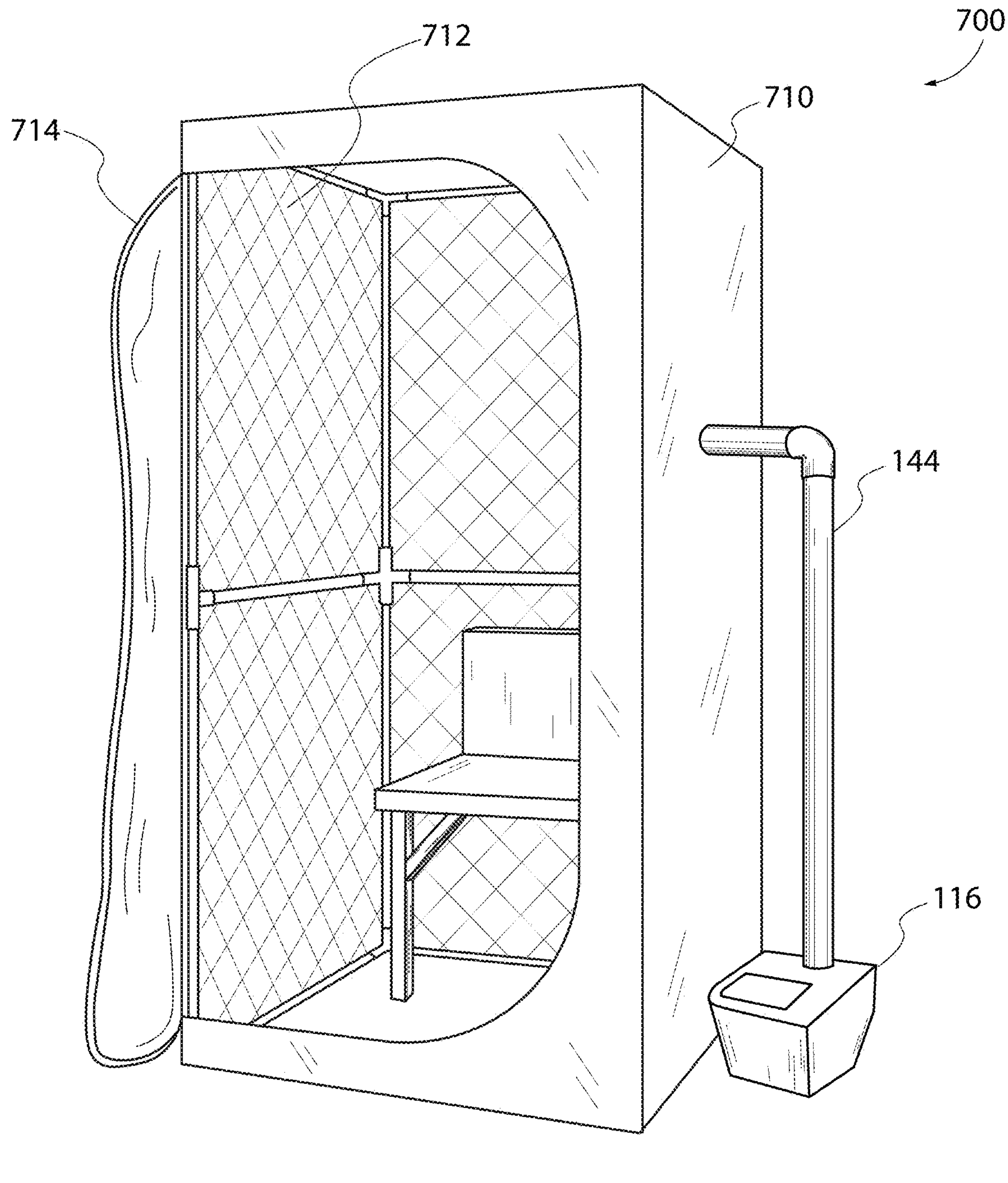
FIG. 7 illustrates an isometric view of a hydrogen-infused electrolytic aerosol generation system with a portable fabric enclosure having a fabric door.

FIG. 7 illustrates a portable enclosure 700 configured as a fabric enclosure for the hydrogen-infused electrolytic aerosol wellness system. The portable enclosure 700 includes a fabric door 714 that provides access to the interior space while maintaining containment of the aerosol during operation. A reflective interior 712 lines the internal surfaces of the portable enclosure 700 to enhance the distribution of light within the enclosure. The fabric door 714 may include sealing mechanisms such as zippers, velcro strips, or magnetic closures to maintain proper containment of the hydrogen-infused electrolytic aerosol. The reflective interior 712 may be constructed from reflective Mylar, aluminum-backed fabric, or other materials with high reflectivity to maximize light distribution and create uniform illumination throughout the portable enclosure 700.

In an illustrative configuration, the portable enclosure 700 demonstrates a fabric enclosure that includes a reflective surface for enhanced therapeutic applications. The reflective interior 712 serves to distribute the full-spectrum light from the first light source throughout the interior space, creating more uniform exposure conditions for users. The fabric door 714 allows for easy entry and exit while maintaining the integrity of the controlled environment within the portable enclosure 700. The fabric construction of the portable enclosure 700 provides flexibility for storage and transport, making the system suitable for various locations and applications. The reflective interior 712 may also enhance the photoelectric effects on the hydrogen-infused electrolytic aerosol by providing multiple reflection points for the light energy.

The portable enclosure 700 may also be configured as a reflective Mylar grow enclosure for plant cultivation applications. In such configurations, the reflective interior 712 optimizes light distribution for photosynthesis while the hydrogen-infused electrolytic aerosol provides enhanced hydration and mineral delivery to plants. The fabric door 714 allows for easy access to plants while maintaining the controlled atmosphere within the grow enclosure. Alternatively, the portable enclosure 700 can be sized and configured for human occupancy as a sensory deprivation environment where the reflective interior 712 creates an immersive light experience. The fabric construction allows for various sizes and shapes to accommodate different applications, from personal wellness pods to larger therapeutic spaces.

Figure 8:
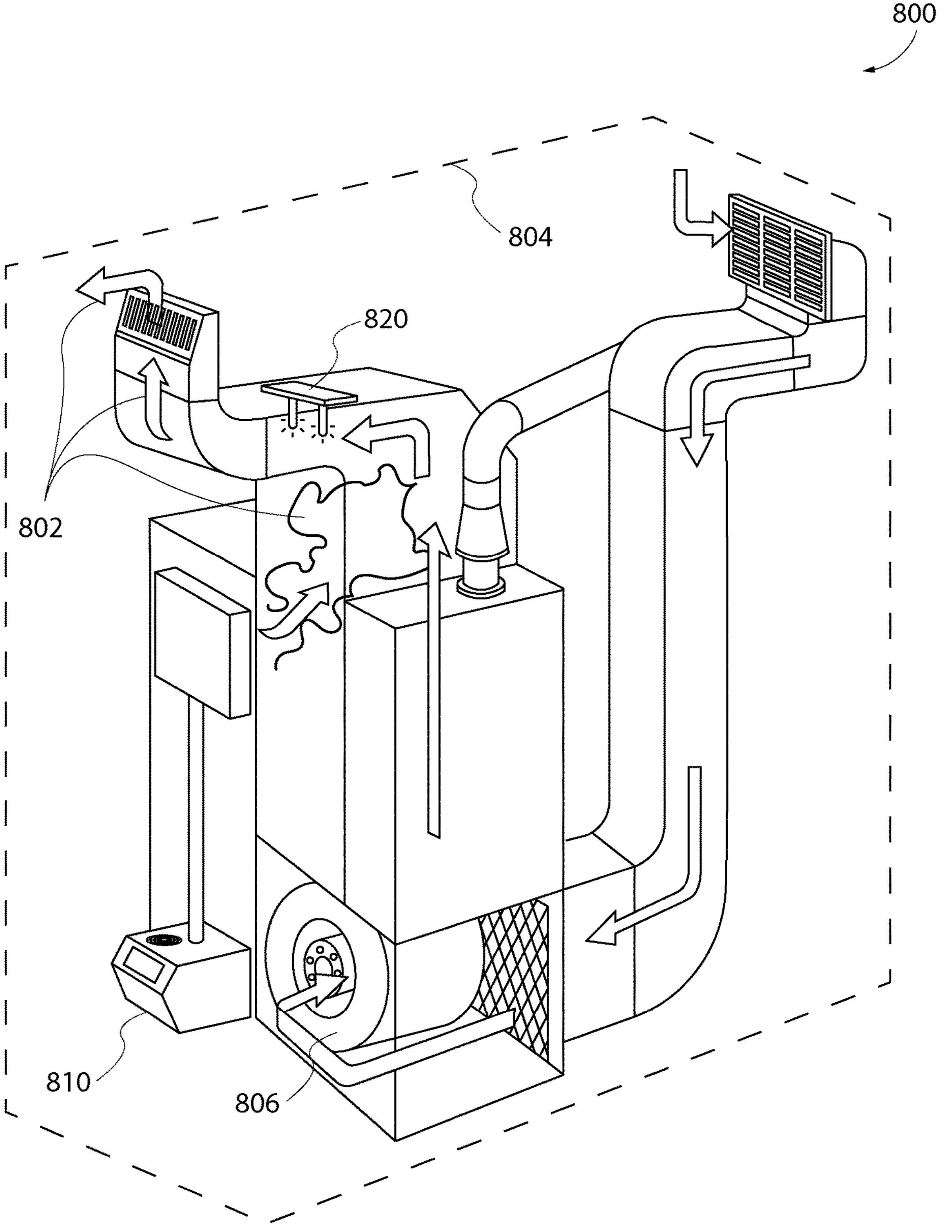
FIG. 8 illustrates a schematic diagram of a hydrogen-infused electrolytic aerosol generation system integrated with an HVAC system (e.g., illustrated as a home heating and cooling system furnace as an example).

FIG. 8 illustrates a schematic diagram of a heating, ventilation, and air conditioning (HVAC) vapor system 800 configured for integration with residential or commercial heating, ventilation, and air conditioning systems of a building (house, office, etc.). The HVAC vapor system 800 includes an HVAC housing 810 that contains the hydrogen generation and aerosol production components in a compact configuration suitable for installation within existing HVAC infrastructure. The HVAC housing 810 may be positioned adjacent to or within the ductwork of a conventional furnace system comprising a blower 806, allowing the generated hydrogen-infused electrolytic aerosol to be distributed throughout a building's ventilation network. A secondary light source 820 may be positioned within the HVAC housing 810 to provide illumination and activation of the electrolytic mineral solution during the aerosol generation process. The secondary light source 820 may include ultraviolet and infrared light components that enhance the bioactivity of the generated aerosol through photoelectric and photovoltaic effects on the electrolytic minerals.

The HVAC vapor system 800 enables whole-building air purification and treatment applications by integrating the hydrogen-infused electrolytic aerosol generation directly into the building's existing air (e.g. condition air 802) circulation infrastructure. The HVAC housing 810 may be designed with mounting brackets and connection ports that facilitate installation within standard HVAC cabinets or ductwork configurations. The secondary light source 820 may operate continuously or on a programmed schedule to maintain consistent aerosol activation and sterilization of the water and mineral solution. Additionally, the HVAC housing 810 may include ventilation ports and airflow channels that allow the generated aerosol to be efficiently distributed through the building's ductwork system. The integration configuration allows for automated operation without requiring manual intervention or frequent maintenance by building occupants.

Figure 9:
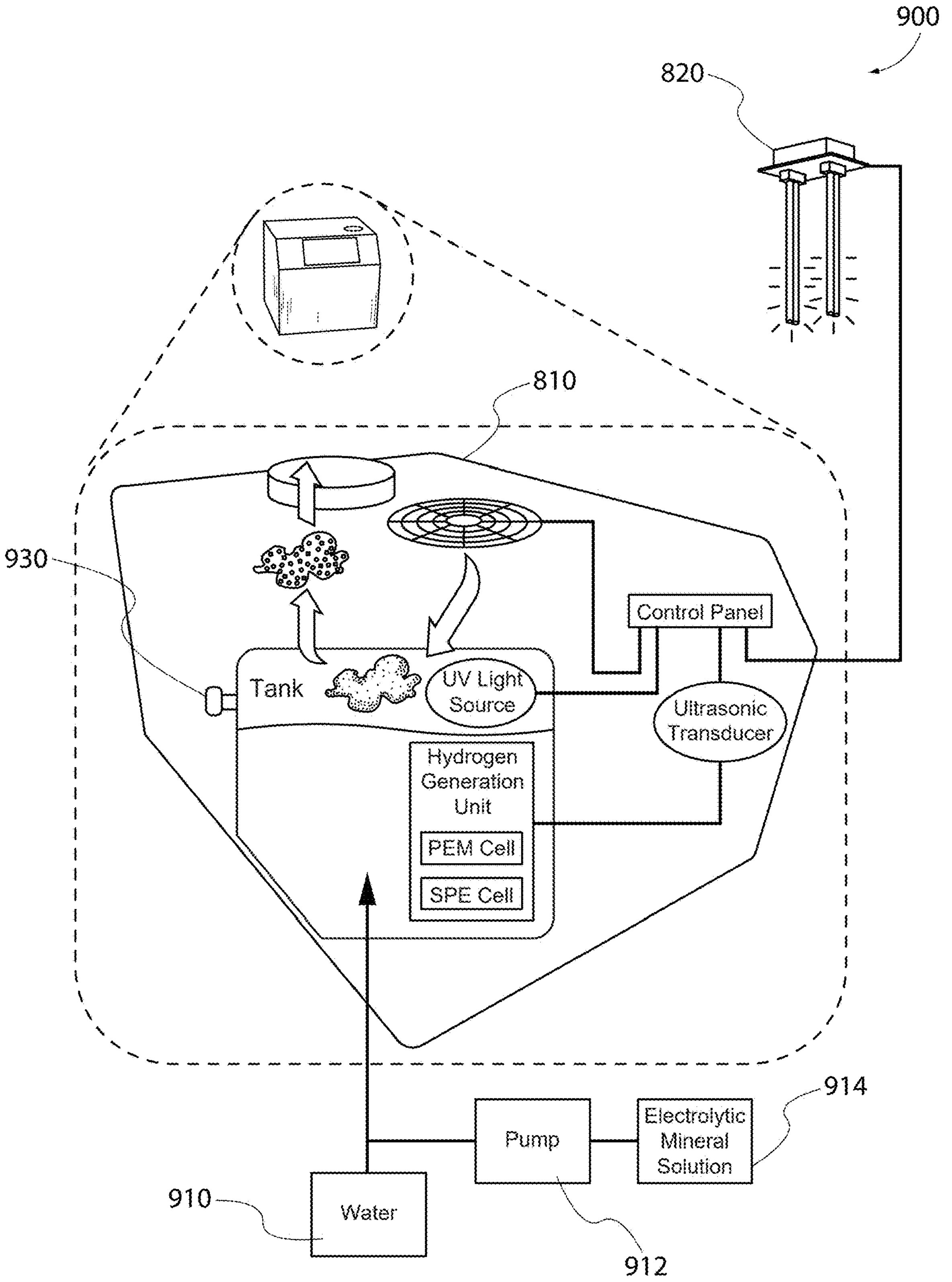
FIG. 9 illustrates a system diagram of the hydrogen-infused electrolytic aerosol generation system of FIG. 8 with a municipal water supply and metering pump attached to a larger supply of electrolyte.

FIG. 9 illustrates a detailed system diagram of an HVAC system 900 that incorporates the hydrogen-infused electrolytic aerosol generation technology with automated mineral solution dispensing capabilities. The HVAC system 900 includes a water supply 910 connection that provides continuous water feed to the aerosol generation components. A metering pump 912 may be connected to the water supply 910 to provide precise dispensing of an electrolytic mineral solution 914 into the water stream at predetermined concentrations. The metering pump 912 may include digital controls and flow rate adjustment capabilities that allow for accurate dosing of the electrolytic mineral solution 914 at a concentration of 10 milliliters per gallon of water. The electrolytic mineral solution 914 may be stored in a reservoir connected to the metering pump 912, and the metering pump 912 may include sensors and monitoring systems that track solution levels and dispensing rates.

In an illustrative configuration, the HVAC system 900 maintains a liquid level 930 within the system components to ensure proper operation of the ultrasonic transducers and hydrogen generation cells. The liquid level 930 may be monitored by sensors that communicate with the system controller to maintain optimal water coverage over the transducers and extraction components. The metering pump 912 may include a digital chlorine injector mechanism that provides continuous water feed capability for automated operation without manual intervention. Moreover, the water supply 910 connection allows the system to operate continuously without requiring manual refilling of water reservoirs, making the HVAC system 900 suitable for long-term installation in residential and commercial buildings (generically referred to as a building 804, FIG. 8). The electrolytic mineral solution 914 may be automatically dispensed by the metering pump 912 based on water flow rates and predetermined concentration requirements, ensuring consistent aerosol quality and effectiveness throughout the building's ventilation system.

Figure 10:
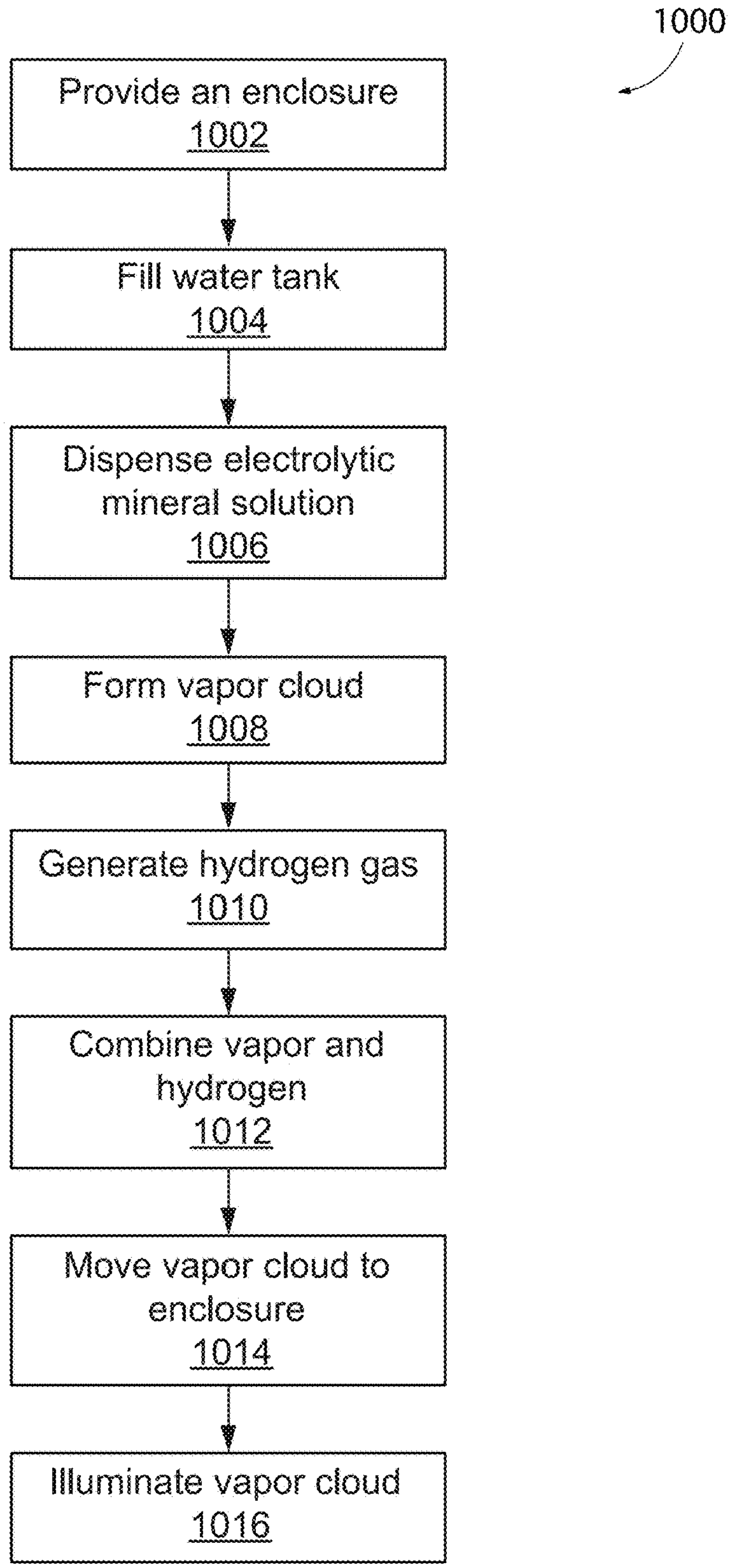
FIG. 10 illustrates a flowchart for a method of generating hydrogen-infused electrolytic aerosol.

FIG. 10 illustrates a method 1000 for generating a hydrogen-infused electrolytic aerosol for wellness applications. The method 1000 includes a series of sequential steps that facilitate the creation and delivery of the hydrogen-infused electrolytic aerosol within an enclosure configured to receive a human. The method 1000 begins with providing an enclosure and progresses through various operational phases, including water preparation, electrolytic solution dispensing, vapor cloud formation, hydrogen gas generation, component mixing, vapor conveyance, and final illumination of the vapor cloud.

The method 1000 commences with a step 1002 that involves providing an enclosure configured to accommodate a human user. The enclosure may be selected from various configurations, including an infrared sauna, a sensory deprivation flotation tank, a sauna box, or a fabric enclosure with reflective surfaces. Following the enclosure provision, a step 1004 involves filling a water tank with water to establish the aqueous base for the electrolytic solution. The water tank may be filled to a predetermined level that ensures proper coverage of ultrasonic transducers positioned within the tank. Additionally, the water level may be monitored and maintained through automated systems to optimize vapor cloud generation throughout the operational cycle.

A step 1006 involves dispensing an electrolytic mineral solution into the water using an electrolytic mineral solution dispenser. The electrolytic mineral solution may include a plurality of electrolytic mineral elements, including chloride or magnesium chloride components. The concentration of the electrolytic mineral solution may be adjusted based on user preferences or predetermined wellness protocols to achieve desired therapeutic effects. The dispensing process creates an aqueous electrolyte solution that serves as the foundation for subsequent vapor cloud formation. Moreover, the electrolytic mineral solution dispenser may be configured to deliver precise concentrations of the mineral solution to maintain consistent aerosol properties.

In an illustrative configuration, a step 1008 involves forming a vapor cloud of the water and electrolytic mineral solution using one or more ultrasonic transducers positioned in the water tank. The ultrasonic transducers may operate at specific frequencies to achieve optimal atomization of the aqueous electrolyte solution. The vapor cloud formation process converts the liquid electrolyte solution into fine droplets that can be readily combined with hydrogen gas in subsequent processing steps. The ultrasonic transducers may include stainless steel discs positioned at the bottom of the water tank to enhance durability and performance during extended operational periods.

A step 1010 involves generating hydrogen gas using a hydrogen generation unit that includes one or more proton exchange membrane (PEM) cells or solid polymer electrolysis (SPE) cells. The hydrogen generation unit may be configured to produce hydrogen gas at controlled rates that correspond to the vapor cloud production capacity of the ultrasonic transducers. The hydrogen gas generation process may be synchronized with the vapor cloud formation to ensure optimal mixing ratios between the vapor cloud and hydrogen gas components. The hydrogen generation unit may include control systems that monitor and adjust hydrogen production rates based on operational parameters and user requirements.

A step 1012 involves combining the vapor cloud of the water and electrolytic mineral solution with the hydrogen gas in a mixing chamber. The mixing chamber may be configured to facilitate thorough integration of the vapor cloud and hydrogen gas components to create a homogeneous hydrogen-infused electrolytic aerosol. The mixing process may be enhanced through controlled airflow patterns and residence time optimization within the mixing chamber. The mixing chamber may include sensors that monitor the composition and properties of the combined aerosol to ensure consistent quality and therapeutic effectiveness.

A step 1014 involves moving the vapor cloud into the enclosure through a conveyance path that connects the mixing chamber to the enclosure interior. The conveyance path may include the blower 806 in fluid communication with the path to direct the vapor cloud into the enclosure at controlled flow rates. Controlling a flow rate of the vapor cloud into the enclosure using the blower 806 in fluid communication with the conveyance path allows for precise delivery of the aerosol to the user. The flow rate may be adjusted based on user comfort and treatment efficacy requirements to optimize the therapeutic experience. Additionally, the conveyance path may include filtration or conditioning components that further refine the aerosol properties before delivery to the enclosure.

A step 1016 involves illuminating the vapor cloud inside the enclosure using a light source configured to emit full-spectrum light. The light source may include infrared light and ultraviolet light components that interact with the hydrogen-infused electrolytic aerosol to enhance therapeutic properties. The illumination process may create photoelectric and photovoltaic effects that polarize the vapor cloud and increase bioactivity of the aerosol components. The intensity and duration of the full-spectrum light exposure may be controlled based on user-specific treatment parameters to achieve desired wellness outcomes. Moreover, the light source may be positioned within the enclosure to ensure uniform illumination of the vapor cloud throughout the treatment space.

Figure 11:
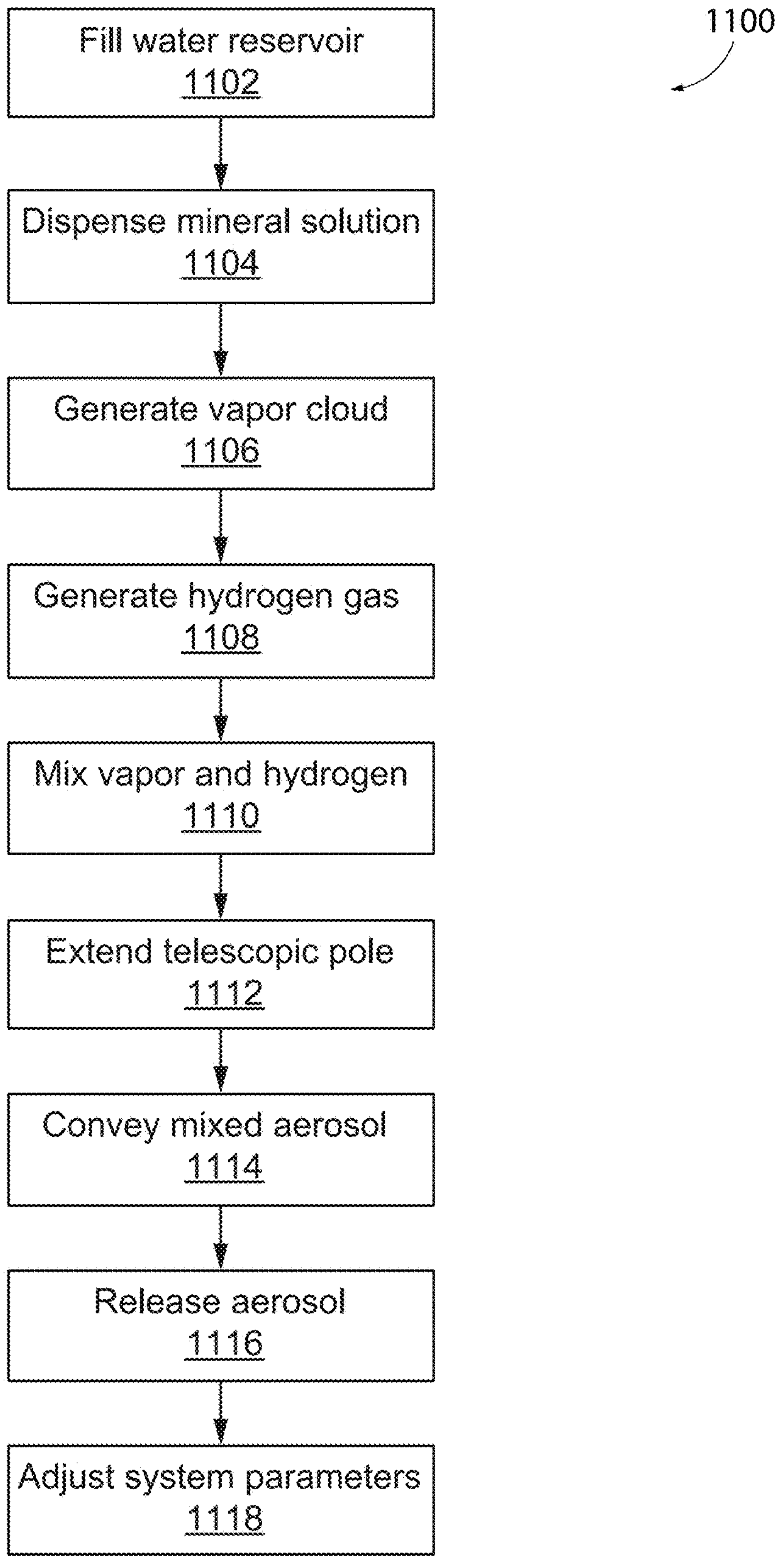
FIG. 11 illustrates a flowchart for a method of operating a hydrogen-infused electrolytic aerosol system with telescoping pole adjustment.

FIG. 11 illustrates a flowchart for a method 1100 of operating a hydrogen-infused electrolytic aerosol system. The method 1100 includes a systematic sequence of operational steps that enable comprehensive control and management of the aerosol generation process. A step 1102 involves filling a water reservoir in a base unit with water, establishing the foundational liquid medium for the system operation. The step 1102 may include monitoring water quality parameters and ensuring appropriate water levels for optimal system performance. Additionally, the step 1102 can include verification of water temperature and purity specifications to maintain consistent aerosol generation characteristics throughout the operational cycle.

Following the initial water preparation, a step 1104 involves dispensing an electrolytic mineral solution into the water within the reservoir. The step 1104 may include precise metering of the electrolytic mineral solution to achieve the specified concentration of 10 milliliters per gallon of water. The dispensing process can utilize automated dosing mechanisms or manual addition procedures, depending on the system configuration. Moreover, the step 1104 can include mixing procedures to ensure uniform distribution of the electrolytic mineral solution throughout the water volume, creating a homogeneous aqueous electrolyte solution for subsequent processing stages.

A step 1106 involves activating an ultrasonic transducer to generate a vapor cloud from the mineral-infused water. The step 1106 may include energizing the ultrasonic transducer at the specified frequency of 2.4 MHz to achieve optimal atomization of the aqueous electrolyte solution. The activation process can include gradual power ramping to prevent system shock and ensure stable vapor cloud formation. Furthermore, the step 1106 can include monitoring of transducer performance parameters such as power consumption, frequency stability, and vapor production rates to maintain consistent aerosol generation throughout the operational period.

In an illustrative configuration, a step 1108 involves generating hydrogen gas using a hydrogen gas generator that includes PEM cells or SPE cells. The step 1108 may include initiating electrolysis processes within the hydrogen generation unit to produce hydrogen gas from the aqueous electrolyte solution. The hydrogen generation process can include monitoring of electrical parameters such as current, voltage, and power consumption to ensure optimal gas production rates. Additionally, the step 1108 can include safety monitoring procedures to detect and respond to any anomalous conditions during the hydrogen generation process, maintaining safe operational parameters throughout the system operation.

A step 1110 involves mixing the vapor cloud and hydrogen gas in a mixing chamber to create the hydrogen-infused electrolytic aerosol. The step 1110 may include controlling the flow rates of both the vapor cloud and hydrogen gas to achieve optimal mixing ratios for the intended application. The mixing process can include turbulence generation or static mixing elements to ensure thorough combination of the vapor and gas components. Moreover, the step 1110 can include temperature and pressure monitoring within the mixing chamber to maintain optimal conditions for aerosol formation and stability.

A step 1112 involves extending a telescoping pole 146, FIG. 1 connected to the base unit to position the aerosol release point at the desired location. The step 1112 may include the mechanical extension of the telescoping pole to achieve the appropriate height or positioning for aerosol delivery. The extension process can include locking mechanisms to secure the telescoping pole at the desired position and prevent unwanted movement during operation. Furthermore, the step 1112 can include verification of the structural integrity and stability of the extended telescoping pole to ensure safe and reliable aerosol delivery throughout the operational period.

A step 1114 involves conveying the mixed vapor cloud and hydrogen gas through an internal channel in the telescoping pole. The step 1114 may include maintaining appropriate flow velocities and pressures within the internal channel to ensure efficient transport of the aerosol mixture. The conveyance process can include monitoring of flow parameters and pressure differentials to detect any blockages or restrictions within the internal channel. Additionally, the step 1114 can include temperature control measures to prevent condensation or other phase changes that could affect aerosol quality during transport through the telescoping pole.

In an illustrative configuration, a step 1116 involves releasing the hydrogen-infused electrolytic aerosol from a vent at the top of the telescoping pole. The step 1116 may include controlling the release rate and pattern of the aerosol to achieve optimal distribution within the target environment. The release process can include directional control mechanisms to guide the aerosol flow toward specific areas or applications. Moreover, the step 1116 can include monitoring of aerosol characteristics such as particle size distribution, concentration, and dispersion patterns to ensure consistent delivery of the hydrogen-infused electrolytic aerosol.

A step 1118 involves adjusting system parameters using a control panel on the base unit to optimize performance for specific applications or user preferences. The step 1118 may include modification of operational parameters such as ultrasonic transducer power, hydrogen generation rates, mixing ratios, and aerosol release patterns. The adjustment process can include real-time monitoring of system performance indicators and automatic feedback control to maintain desired operational characteristics. Furthermore, the step 1118 can include data logging and analysis capabilities to track system performance over time and enable predictive maintenance or optimization procedures for enhanced operational efficiency and reliability.

The hydrogen-infused electrolytic aerosol disclosed herein exhibits distinctive biological and physical properties that facilitate enhanced interaction with biological systems. The aerosol includes sub-micron hydrogen vapor particles that demonstrate the ability to permeate various biological barriers, including cellular membranes, soft tissues, hair follicles, and skin layers. These particles may penetrate into the bloodstream, lymphatic system, and cellular structures due to their reduced molecular dimensions. The sub-micron particle size distribution enables the aerosol to traverse biological membranes that would otherwise restrict larger particles, thereby facilitating direct cellular interaction and potential therapeutic delivery.

The vapor cloud demonstrates low surface tension characteristics that contribute to enhanced biological assimilation properties. The reduced surface tension allows the aerosol particles to spread more readily across biological surfaces and penetrate into tissue matrices with reduced resistance. Additionally, the small molecular size of the aerosol components enables improved wetting characteristics and enhanced contact with biological surfaces. These physical properties work in combination to facilitate deeper penetration into biological tissues compared to conventional aerosol systems with larger particle sizes and higher surface tension values.

In an illustrative configuration, the system generates water vapor with negative oxidation-reduction potential (ORP) characteristics that impart specific electrical charge properties to the aerosol. The negative ORP values indicate the presence of excess electrons within the aerosol system, creating a reducing environment that may interact with biological oxidation processes. The electrical charge properties of the aerosol may influence cellular membrane potentials and facilitate enhanced transport across charged biological barriers. The negative ORP characteristics may also contribute to the antioxidant properties of the aerosol, potentially neutralizing reactive oxygen species upon contact with biological systems.

The combination of sub-micron particle size, low surface tension, and negative ORP characteristics creates an aerosol system with enhanced bioavailability compared to conventional delivery methods. The physical properties enable the aerosol to function as a transdermal delivery system that bypasses traditional absorption barriers. The small molecular dimensions allow for rapid diffusion through tissue matrices, while the electrical charge properties may facilitate active transport mechanisms across cellular membranes. These characteristics collectively enable the aerosol to deliver electrolytic minerals and hydrogen gas directly to cellular and subcellular compartments where metabolic processes occur.

The hydrogen-infused electrolytic aerosol generation system disclosed herein supports REDOX (reduction-oxidation) reactions and homeostatic balanced pathways that may provide cellular health benefits. REDOX reactions involve the exchange of electrons between different chemical species, where oxidation represents the loss of electrons and reduction represents the gain of electrons. The electrolytic mineral solution creates an environment conducive to these electron transfer processes by providing a medium rich in ionic species that can participate in oxidation and reduction reactions. The system facilitates the maintenance of homeostatic balance by supporting the body's natural ability to regulate oxidative stress through controlled electron exchange mechanisms.

The vapor cloud generated by the system operates as a transceiver that allows the introduction of additional acoustic, radio, bio, and healing frequencies, along with phototherapies and plasmas. The conductive properties of the electrolytic mineral solution enable the vapor cloud to transmit and receive various electromagnetic frequencies across different spectrums. This transceiver functionality stems from the ionic nature of the electrolytic minerals, which create a conductive medium capable of propagating electromagnetic signals. The vapor cloud can serve as a carrier medium for therapeutic frequencies, allowing for the integration of multiple treatment modalities within a single delivery system.

In an illustrative configuration, the electron-photon conversion processes within the system are facilitated by the magnesium chloride component of the electrolytic mineral solution. Magnesium chloride enables the conversion of electrons to photons and vice versa, similar to processes utilized in photovoltaic cell applications. This conversion capability allows the system to harness and manipulate electromagnetic energy across different forms, enhancing the bioactivity of the generated aerosol. The presence of magnesium ions in the solution creates pathways for photonic interactions that may amplify the therapeutic effects of the light sources used in the system.

The homeostatic functions of the system extend beyond simple mineral supplementation to include support for the body's natural regulatory mechanisms. The electrolytic mineral solution provides a balanced ratio of cations and anions that may help maintain proper cellular electrical potential and fluid balance. This balanced ionic environment supports the body's ability to regulate pH levels, maintain proper hydration, and facilitate efficient cellular communication. The system creates conditions that may promote the body's natural ability to neutralize reactive oxygen species and maintain oxidative balance through enhanced antioxidant enzyme activity.

The hydrogen-infused electrolytic aerosol generation system disclosed herein may be adapted for diverse applications beyond wellness environments. In greenhouse applications, the system facilitates accelerated plant growth and increased nutrient uptake through the delivery of the hydrogen-infused electrolytic aerosol directly to plant environments. The sub-micron vapor particles penetrate plant tissues and cellular structures, potentially enhancing photosynthetic processes and metabolic functions. The electrolytic mineral solution, containing 78 mineral elements, provides plants with bioavailable nutrients that may be absorbed through foliar uptake mechanisms. Additionally, the hydrogen component of the aerosol may contribute to plant stress reduction and improved cellular respiration processes.

The system finds application in vegetable and fruit storage facilities where the hydrogen-infused electrolytic aerosol may improve texture and extend the shelf life of produce. The aerosol creates an environment with modified atmospheric conditions that may slow oxidative processes responsible for deterioration of produce. The electrolytic minerals in the aerosol may help maintain cellular integrity in stored fruits and vegetables by supporting natural preservation mechanisms. The hydrogen component may act as an antioxidant, potentially reducing free radical damage that contributes to spoilage. Storage facilities can integrate the system into existing ventilation or climate control systems to distribute the aerosol throughout storage areas.

In an illustrative configuration, the electrolytic solution may be utilized through various delivery methods beyond aerosol generation. The solution can be ingested as a dietary supplement, providing the body with the concentrated mineral elements in bioavailable form. Transdermal application allows the electrolytic minerals to be absorbed through skin contact, potentially bypassing digestive processes. The solution may be spritzed directly onto surfaces or into air spaces for localized treatment applications. Furthermore, the electrolytic solution can be incorporated into ultrasonic diffusers and cool mist humidifiers, enabling distribution through existing home or commercial humidification systems.

The methods, systems, devices, and configurations described herein are illustrative examples, and implementations may vary by omitting, substituting, or adding various procedures or components as appropriate. For instance, the methods may be performed in different orders, and various steps may be added, omitted, or combined in alternative implementations. Features described with respect to certain configurations may be combined in various other configurations. Different aspects and elements of the disclosed embodiments may be combined in a similar manner.

Unless defined otherwise, all technical and scientific terms used herein have the same meaning as commonly understood by one of ordinary skill in the relevant art. As used herein, the articles "a" and "an" refer to one or more than one (i.e., to at least one) of the grammatical object of the article. "About" and/or "approximately" as used herein when referring to a measurable value such as an amount, a temporal duration, and the like, encompasses variations of ±20%, ±10%, ±5%, or ±0.1% from the specified value as appropriate in the context of the systems, devices, circuits, methods, and other implementations described herein. "Substantially," as used herein when referring to a measurable value such as an amount, a temporal duration, a physical attribute (such as frequency), and the like, also encompasses variations of ±20%, ±10%, ±5%, or ±0.1% from the specified value as appropriate in the context of the systems, devices, circuits, methods, and other implementations described herein.

As used herein, including in the claims, "and" as used in a list of items prefaced by "at least one of" or "one or more of" indicates that any combination of the listed items may be utilized. For example, a list of "at least one of A, B, and C" includes any of the combinations A, B, C, AB, AC, BC, and/or ABC (i.e., A, B, and C). Furthermore, to the extent more than one occurrence or use of the items A, B, or C is possible, multiple uses of A, B, and/or C may form part of the contemplated combinations. For example, a list of "at least one of A, B, and C" may include AA, AAB, AAA, BB, etc.

While illustrative embodiments of the disclosed systems and methods have been described in detail herein, it is to be understood that the inventive concepts may be otherwise variously embodied and employed, and that the appended claims are intended to be construed to include such variations except as limited by the prior art. The principles of the disclosure have been described in connection with specific apparatuses and methods, but it should be clearly understood that these descriptions are provided only by way of example and not as limitations on the scope of the disclosure.

What is claimed is:

1. A system for generating a hydrogen-infused electrolytic aerosol for wellness, the system comprising:
- an enclosure;
- a water tank containing water;
- an electrolytic mineral solution dispenser configured to dispense an electrolytic mineral solution into the water, wherein the water with the electrolytic mineral solution forms an aqueous electrolyte solution;
- at least one ultrasonic transducer in the water tank, the ultrasonic transducer configured to form a vapor cloud of the aqueous electrolyte solution;
- a hydrogen generation unit, configured to generate hydrogen gas, the hydrogen generation unit comprising:
  - a proton exchange membrane (PEM) cell, or
  - a solid polymer electrolysis (SPE) cell;
- a mixing chamber configured to combine the vapor cloud of the aqueous electrolyte solution and the hydrogen gas;
- a conveyance path configured to move the vapor cloud into the enclosure; and
- a first light source configured to emit light and to illuminate the vapor cloud.

2. The system of claim 1, wherein the enclosure is sized and configured to either:
- receive a human, or
- condition air of a building.

3. The system of claim 1, wherein the electrolytic mineral solution comprises:
- a plurality of electrolytic mineral elements comprising at least:
  - a chloride, or
  - a magnesium chloride.

4. The system of claim 3, wherein a concentration of the magnesium chloride is greater than a concentration of magnesium chloride in seawater.

5. The system of claim 1, wherein the first light source comprises at least one of:
- an infrared light, and
- an ultraviolet light.

6. The system of claim 1, further comprising:
- a blower in fluid communication with the conveyance path, the blower configured to direct the vapor cloud into the enclosure.

7. The system of claim 1, wherein the enclosure is selected from a group comprising:
- an infrared sauna,
- a sensory deprivation flotation tank,
- a sauna box, and
- a fabric enclosure.

8. The system of claim 1, wherein the enclosure is a fabric enclosure comprising:
- a reflective surface.

9. The system of claim 1, further comprising a system controller configured to adjust at least one of:
- a concentration of the electrolytic mineral solution,
- an output of the ultrasonic transducer,
- a hydrogen generation rate of the hydrogen generation unit, and
- an intensity of the first light source.

10. The system of claim 9, wherein the controller is further configured to monitor and maintain a specific water level in the water tank to ensure coverage of the ultrasonic transducer.

11. The system of claim 9 and further comprising:
- a control panel on a base unit for adjusting system parameters.

12. A method for generating a hydrogen-infused electrolytic aerosol for wellness, the method comprising the steps of:
- providing an enclosure;
- filling a water tank with water;
- dispensing an electrolytic mineral solution into the water using an electrolytic mineral solution dispenser;
- forming a vapor cloud of the water and the electrolytic mineral solution using at least one ultrasonic transducer in the water tank;
- generating hydrogen gas using a hydrogen generation unit comprising a proton exchange membrane (PEM) cell or a solid polymer electrolysis (SPE) cell;
- combining the vapor cloud of the water and electrolytic mineral solution with the hydrogen gas in a mixing chamber;
- moving the vapor cloud into the enclosure through a conveyance path; and
- illuminating the vapor cloud inside the enclosure using a light source configured to emit light.

13. The method of claim 12, further comprising the step of:
- adjusting a concentration of the electrolytic mineral solution based on user preferences or predetermined wellness protocols.

14. The method of claim 12, wherein the light comprises at least one of; infrared light and ultraviolet light, and wherein the method further comprises the step of:
- controlling an intensity and duration of the light based on user-specific treatment parameters.

15. The method of claim 12, further comprising the step of:
- monitoring and maintaining a specific water level in the water tank to ensure coverage of the ultrasonic transducer and extraction of the vapor cloud.

16. The method of claim 12, wherein the enclosure is a fabric enclosure, and the method further comprises the step of:
- configuring the fabric enclosure with a reflective inner surface to enhance distribution of the light within the enclosure.

17. The method of claim 12, further comprising the step of:
- controlling a flow rate of the vapor cloud into the enclosure using a blower in fluid communication with the conveyance path, wherein the flow rate may be adjusted based on user comfort and treatment efficacy.

18. A method of operating a hydrogen-infused electrolytic aerosol system, the method comprising the step of:

filling a water reservoir in a base unit with water;

dispensing an electrolytic mineral solution into the water thereby creating a mineral-infused water;

activating an ultrasonic transducer to generate a vapor cloud from the mineral-infused water;

generating hydrogen gas using a hydrogen gas generator;

mixing the vapor cloud and hydrogen gas in a mixing chamber;

extending a telescoping pole connected to the base unit;

conveying the mixed vapor cloud and hydrogen gas through an internal channel in the telescoping pole;

releasing the hydrogen-infused electrolytic aerosol from a vent at a top of the telescoping pole; and adjusting system parameters using a control panel on the base unit.

* * * * *